US009880777B1

United States Patent
Bono et al.

(10) Patent No.: US 9,880,777 B1
(45) Date of Patent: Jan. 30, 2018

(54) EMBEDDED SYNCHRONOUS REPLICATION FOR BLOCK AND FILE OBJECTS

(71) Applicant: EMC Corporation, Hopkinton, MA (US)

(72) Inventors: Jean-Pierre Bono, Westborough, MA (US); Himabindu Tummala, South Grafton, MA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 522 days.

(21) Appl. No.: 14/139,036

(22) Filed: Dec. 23, 2013

(51) Int. Cl.
*G06F 3/06* (2006.01)
*G06F 12/02* (2006.01)
*G06F 17/30* (2006.01)

(52) U.S. Cl.
CPC ............ *G06F 3/065* (2013.01); *G06F 3/067* (2013.01); *G06F 3/0619* (2013.01); *G06F 17/30088* (2013.01); *G06F 17/30174* (2013.01); *G06F 17/30176* (2013.01); *G06F 17/30212* (2013.01); *G06F 17/30215* (2013.01); *G06F 17/30581* (2013.01)

(58) Field of Classification Search
CPC ........ G06F 17/30174; G06F 17/30088; G06F 17/30176; G06F 17/30212; G06F 17/30215; G06F 17/30581
USPC ........................................................ 711/162
See application file for complete search history.

(56) References Cited

U.S. PATENT DOCUMENTS

| | | |
|---|---|---|
| 7,254,685 B1 | 8/2007 | Cardente |
| 7,631,155 B1 | 12/2009 | Bono et al. |
| 7,702,871 B1 | 4/2010 | Arnon et al. |
| 8,433,869 B1 | 4/2013 | Natanzon et al. |
| 2004/0030668 A1 | 2/2004 | Pawlowski et al. |
| 2006/0031594 A1 | 2/2006 | Kodama |
| 2007/0106851 A1* | 5/2007 | Bonwick et al. ............ 711/154 |
| 2007/0156961 A1 | 7/2007 | Houzenga et al. |
| 2009/0157766 A1 | 6/2009 | Shen et al. |
| 2009/0313503 A1 | 12/2009 | Atluri et al. |
| 2010/0107158 A1 | 4/2010 | Chen et al. |
| 2010/0262721 A1* | 10/2010 | Asnaashari et al. ............ 710/5 |
| 2011/0208931 A1* | 8/2011 | Pendharkar et al. ......... 711/162 |
| 2013/0013562 A1* | 1/2013 | Sudhakar ...................... 707/636 |
| 2013/0014103 A1* | 1/2013 | Reuther et al. .................. 718/1 |
| 2013/0086202 A1* | 4/2013 | Connelly et al. ............ 709/217 |

OTHER PUBLICATIONS

Bono, "Unified Datapath Architecture," U.S. Appl. No. 13/828,322, filed Mar. 14, 2013.
Bono, et al., "Unified Datapath Processing With Virtualized Storage Processors," U.S. Appl. No. 13/828,294, filed Mar. 14, 2013.
(Continued)

*Primary Examiner* — Mardochee Chery
(74) *Attorney, Agent, or Firm* — BainwoodHuang

(57) ABSTRACT

A technique for performing synchronous replication on both block and file-based objects employs a replication appliance embedded alongside a unified data path IO stack within a storage processor of a data storage system. Various arrangements are described for achieving failover, migration, failback, and load balancing, both involving other embedded replication appliances and involving external replication appliances.

24 Claims, 17 Drawing Sheets

(56) References Cited

OTHER PUBLICATIONS

Bono, et al., et al., "Automatically Creating Multiple Replication Sessions in Response to a Single Replication Command Entered by a User," U.S. Appl. No. 13/837,825, filed Mar. 15, 2013.
Bono, et al., "Unified Data Protection for Block and File Objects," U.S. Appl. No. 13/853,508, filed Mar. 29, 2013.
Bono, et al., "Preserving Quality of Service When Replicating Data Objects," U.S. Appl. No. 14/576,939, filed Dec. 19, 2014.
EMC Corporation, "EMC Celerra Replicator," (http://chucksblog.emc.com/content/CelerraReplicator.pdf) 2008.
EMC Corporation, "EMC RecoverPoint Family," (http://www.emc.com/collateral/software/data-sheet/h2769-recoverpoint-ds.pdf) Aug. 2013.
EMC Corporation, "EMC Business Continuity and Disaster Recovery Solutions," (https://enterpriseportalcontent.mci.com/NR/rdonlyres/7A037904-A72F-4C79-BC21-4731442BFD9A/0/SoCDREventEMCReplicationRW.pdf) 2008.
EMC Corporation, "Array-Based Replication with EMC VPLEX," (http://www.emc.com/collateral/hardware/white-papers/h8005-array-based-replication-vplex-wp.pdf) Aug. 2010.
EMC Corporation, "Using EMC Celerra Replicator," Feb. 2009.

\* cited by examiner

US 9,880,777 B1

EMBEDDED SYNCHRONOUS REPLICATION FOR BLOCK AND FILE OBJECTS

BACKGROUND

Data storage systems commonly employ block-based replication solutions for protecting the data they store. Conventional block-based replication solutions operate on storage volumes (e.g., Logical Unit Numbers, or "LUNs") using Fibre Channel or iSCSI (Internet Small Computer System Interface).

A well-known example of a block-based replication solution is the RecoverPoint system available from EMC Corporation of Hopkinton, Mass. RecoverPoint systems include a replication splitter realized in software, e.g., on a storage processor (SP) that accesses a local block-based array, one or more local replication appliances, and one or more remote replication appliances connected to a remote array configured as a replica site. The replication appliances connect to data storage systems and other replication appliances over a network, and multiple replication appliances can be configured in clusters for load sharing and increased throughput. As a data storage system receives IO requests specifying data to be written to a particular LUN on the local block-based array, the replication splitter intercepts the IO request and sends it to the local replication appliance (or appliances), e.g., over a Fibre Channel or iSCSI connection. The local appliance communicates with the remote appliance, e.g., over a WAN (Wide Area Network), and manages the storage of the data specified in the IO request at the replica site. In this manner, the replica site is made to store data that provide a redundant copy of data on the LUN, which may be used to recover the contents of the LUN in the event of a failure on the local array.

Some data storage systems employ file-based replication. A well-known example of a file-based replication solution is the Celerra Replicator™ V2, also available from EMC Corporation of Hopkinton, Mass. File-based replication typically operates by taking snaps (e.g., point in time copies) of files and file systems at a local site, comparing current snaps with previous snaps, and sending differences to a destination site. The destination site accumulates and stores the differences, which it can use to reconstitute the file or file system being replicated in the event of a failure at the local site.

SUMMARY

Efforts are underway to develop data storage systems having IO stacks with unified data paths for providing access to both block-based objects (e.g., LUNs and block based vVOLs—virtual volumes) and file-based objects (e.g., file systems and file-based vVOLs). Such IO stacks internally represent both block-based objects and file-based objects in the form of storage volumes, which themselves are realized as files in a set of underlying file systems. As the unified data path IO stack represents both block-based objects and file-based objects as underlying volumes, it provides a vehicle for using block-based replication technologies for replicating both block-based objects and file-based objects.

Unfortunately, however, conventional replication appliances are provided as stand-alone processing machines that connect to data storage systems over a network. Although such replication appliances are high performance, they are also costly. Further, when performing synchronous replication, conventional replication appliances involve additional network hops (e.g., from a data storage system to a replication appliance and back again) which increase latency. What is needed is a solution that reduces latency and leverages the unified data path IO stack to enable replication of both block-based objects and file-based objects in an integrated and cost-effective manner.

In contrast with prior replication solutions, an improved technique performs synchronous replication of both block-based objects and file-based objects using a replication appliance embedded alongside a unified data path IO stack within a storage processor of a data storage system. The embedded replication appliance operates as a software construct and can be implemented at little or no additional hardware cost and in a manner that is highly integrated with the IO stack. The improved technique therefore reduces cost, reduces latency, and supports replication of both block-based objects and file-based objects.

In accordance with improvements hereof, certain embodiments are directed to a method of performing synchronous replication in a data storage system. The method includes operating, on a storage processor of the data storage system, an IO stack configured to map IO requests specifying reads and writes of block-based user objects and file-based user objects to reads and writes of files representing the respective user objects in a set of internal file systems of the data storage system. The method further includes operating, on the storage processor, a local replication appliance that communicates with the TO stack operating on the storage processor to synchronously replicate data specified in write TO requests received by the storage processor to another location. The method still further includes, in response to the TO stack receiving an TO request specifying current data to be written to a user object internally represented as a file in the data storage system, the TO stack forwarding the current data to the local replication appliance to mirror the current data to the other storage location.

Other embodiments are directed to a data storage system constructed and arranged to perform the method described above. Still other embodiments are directed to a computer program product. The computer program product stores instructions, which when executed by control circuitry of a data storage system, cause the control circuitry to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique performs synchronous replication of both block-based objects and file-based objects using a replication appliance embedded alongside a unified data path IO stack within a storage processor of a data storage system.

This document is presented in sections to assist the reader in identifying desired information. In the material that follows:

Section I presents an example environment in which improved techniques hereof may be practiced and describes, inter alia, a unified data path architecture for expressing both block-based objects and file-based objects as respective underlying volumes, which are realized in the form of respective underlying files, to enable a common replication approach for both block-based and file-based objects.

Section II presents particular example improvements for effecting synchronous replication of both block-based and file-based objects on a per-data-object basis under the direction of a common replication session manager.

Section III presents particular example improvements for effecting synchronous replication of both block-based and file-based objects using an embedded replication appliance.

Figure 1:
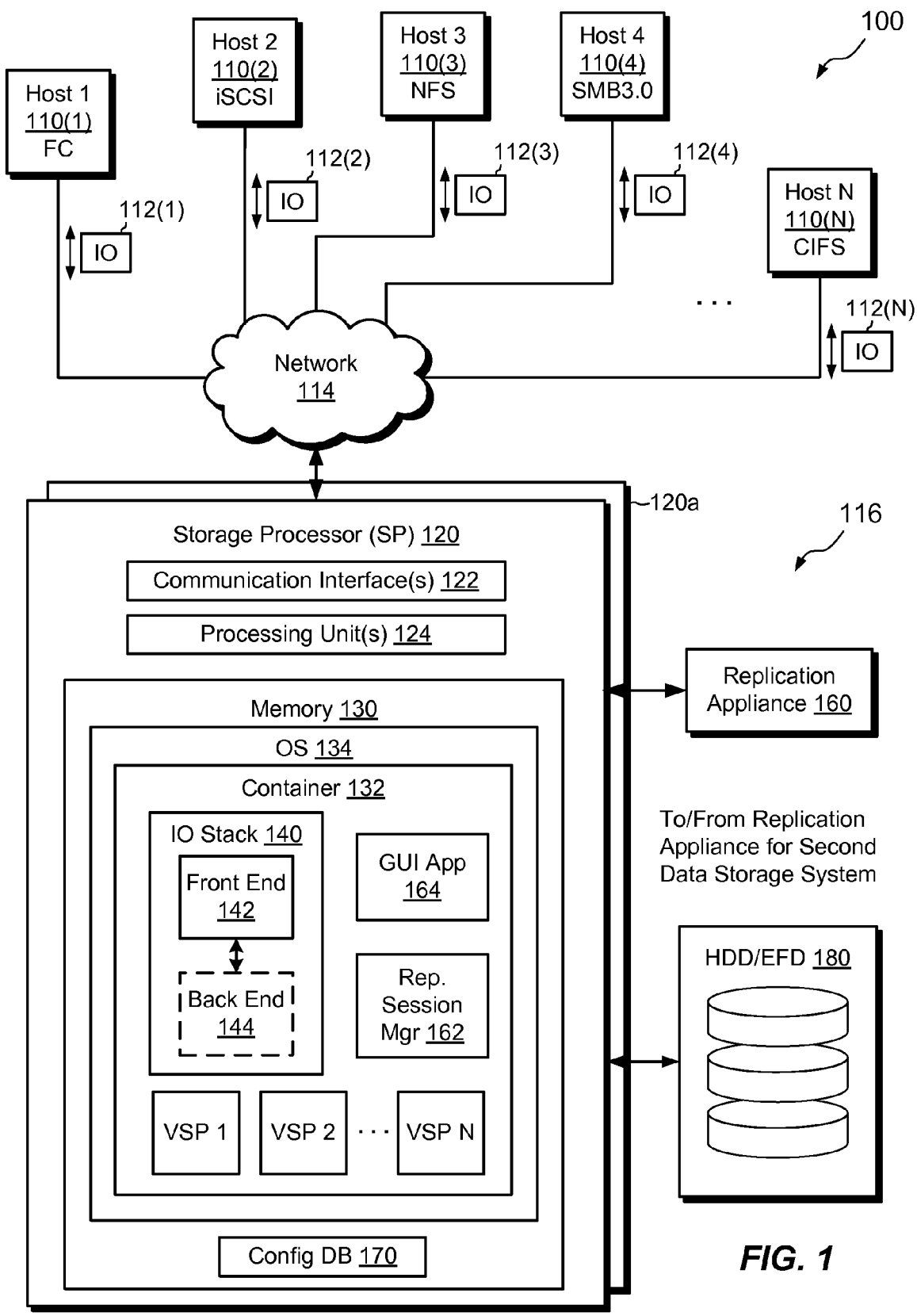
FIG. 1 is a block diagram showing an example environment in which improved techniques hereof may be practiced, wherein the example environment includes a data storage system having a storage processor.

I) Example Environment Including Unified Datapath Architecture:

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of hard disk drives and/or electronic flash drives. The data storage system 116 may include multiple SPs like the SP 120 (see, for example, a second SP 120*a*). For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, adapters, such as SCSI target adapters and network interface adapters, for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel (not shown) and can communicate with one another using interprocess communication (IPC) mediated by the kernel. Containers are well-known features of Unix, Linux, and other operating systems.

In the example of FIG. 1, only a single container 132 is shown. Running within the container 132 is an IO stack 140, a replication session manager 162, a Graphical User Interface (GUI)-based application 164, and multiple VSPs (Virtualized Storage Processors) VSP 1 to VSP N. A VSP is a collection of data objects, internal file systems, and servers (e.g., NFS and/or CIFS servers), which together provide a mechanism for grouping objects and providing a common set of network interfaces such that the VSP appears from outside the SP 120 as similar to a physical SP. Although certain components are shown residing within the container 132, alternatively different components reside in different containers. For example, the GUI-application 164 may run within a dedicated container and communicate with the replication session manager 162 using IPC.

The IO stack 140 provides an execution path for host IOs (e.g., IO requests 112(1-N)) and includes a front end 142 and a back end 144. In alternative arrangements, the back end 144 is located on another SP (e.g., in a modular arrangement) or is provided in a block-based array connected to the SP 120 (e.g., in a gateway configuration).

The replication appliance 160 assists in performing block-based replication of both block-based objects and file-based objects to a second data storage system, which may be located locally to the data storage system 116 or remotely. In an example, the replication appliance 160 takes the form of a hardware unit, and multiple such units may be provided, e.g., in a cluster for supporting strong data compression and other advanced features. For purposes of this document, the replication appliance 160 is described as a single component, although that component may include any number of units, which operate in coordination with one another. Further, and in accordance with additional improvements hereof, the replication appliance 160 may be replaced with a software construct embedded on the SP 120 in the memory 130 and performs similar functions as those described herein for the replication appliance 160. Embedding the replication appliance on the SP 120 is discussed more fully in Section III.

The replication session manager 162 controls the establishment of replication settings on particular data objects, including VSPs. The replication session manager 162 establishes replication settings on a per-data-object basis, conducts replication sessions with replica sites, and orchestrates replication activities, including recovery and failover activities.

The GUI application 164 provides a user interface for configuring the replication session manager 162, e.g., for establishing replication settings on particular data objects. As the IO stack 140, replication appliance 160 (optionally), replication session manager 162, and GUI application 164 all run within the same container 132, the IO stack 140, replication appliance 160 (optionally), and replication session manager 162 can communicate with one another using APIs (application program interfaces) and pointer passing and without the need to use IPC.

The memory 130 is further seen to include a configuration database 170. The configuration database 170 stores configuration information pertaining to the data storage system 116, including information about the VSPs 1-N and the data objects with which they are associated. In other implementations, the data storage system 116 stores the configuration database 170 elsewhere, such as or in the storage 180, on a disk drive of flash drive separate from the SP 120 but accessible to the SP 120, e.g., over a backplane or network, or in some other location.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include mapping IO requests directed to LUNs, host file systems, vVOLs (virtual volumes, e.g., as soon available for VMware, Inc. of Palo Alto, Calif.), VMDKs (virtual memory disks), and other data objects to block-based requests presented to internal volumes, as well as mapping the internal volumes to respective files stored in a set of internal file systems of the data storage system 116. Host IO requests received at the SP 120 for reading and writing block-based objects and file-based objects are thus converted to reads and writes of respective volumes, which are then converted to reads and writes of respective files. As will be described further below, the front end 142 may perform block-based synchronous replication at the level of the internal volumes, where the front end 142 presents both block-based objects and file-based objects in block-based form. After processing by the front end 142, the IO requests propagate to the back end 144, where the back end 144 executes commands for reading and/or writing the physical storage 180, agnostically to whether the data read and/or written is directed to a block-based object or a file-based object.

Figure 2:
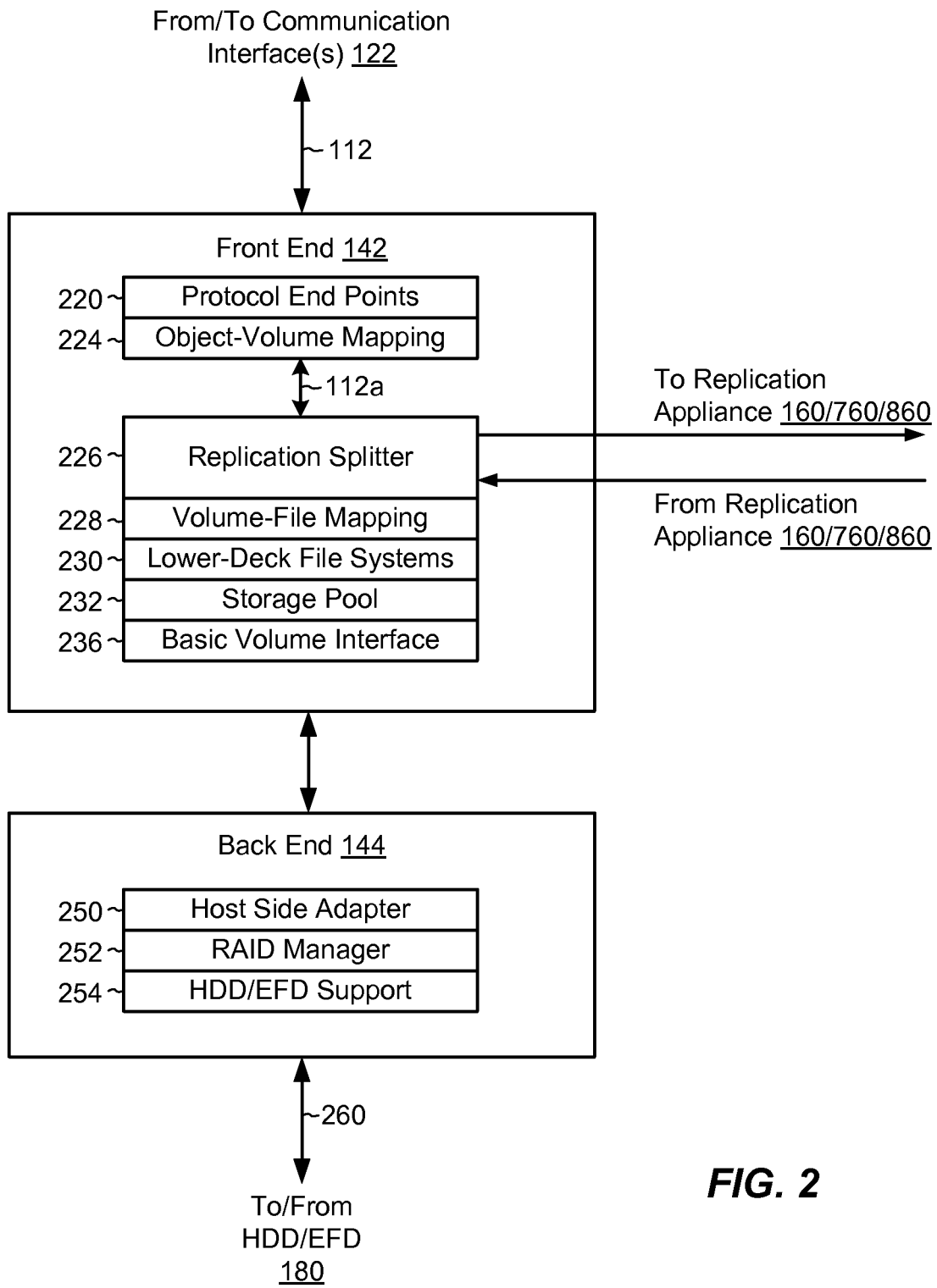
FIG. 2 is a block diagram showing an example IO stack of the storage processor shown in FIG. 1.

FIG. 2 shows the front end 142 and back end 144 of the IO stack 140 in additional detail. Here, the front end 142 is seen to include protocol end points 220, a data object layer 222, an object-volume mapping layer 224, a replication splitter 226, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), for ease of understanding, the different components of the IO stack 140 are described herein from the bottom up.

At the back end 144, the hard disk drive/electronic flash drive support 254 includes drivers that perform the actual reading from and writing to the storage 180. The RAID manager 252 accesses particular storage units (slices) written or read using RAID protocols. The host side adapter 250 provides an interface to the front end 142, for instances in which the front end 142 and back end 144 are run on different machines. When the front end 142 and back end 144 are co-located on the same SP, as they are in FIG. 1, the host side adapter 250 may be omitted or made to perform no operation.

Continuing to the front end 142, the basic volume interface 236 provides an interface to the back end 144 for instances in which the front end 142 and back end 144 are run on different hardware, The basic volume interface 236 may also be inactive in the arrangement shown in FIG. 1.

The storage pool 232 organizes elements of the storage 180 in the form of slices. A "slice" is an increment of storage space, such as 256 MB or 1 GB in size, which is derived from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed by the RAID manager 252, dividing the RAID groups into FLUs (Flare LUNs), and further dividing the FLU's into slices.

The lower-deck file systems 230 are built upon slices managed by a storage pool 232 and represent both block-based objects and file-based objects internally in the form of files. The data storage system 116 may host any number of lower-deck file systems 230, and each lower-deck file system may include any number of files. In a typical arrangement, a different lower-deck file system is provided for each data object to be stored. Each lower-deck file system includes one file that stores the data object itself and, in some instances includes other files that store snaps of the file that stores the data object. Each lower-deck file system 230 has an inode table. The inode table provides a different inode for each file stored in the respective lower-deck file system. The inode table may also store properties of the file(s), such as their ownership and block locations at which the file's/files' data are stored.

The volume-file mapping 228 maps each file representing a data object to a respective volume, which is accessible using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting location (logical unit number) and offsets in the volume, the volume-file mapping 228 can establish a one-to-one correspondence between offsets into the file and offsets into the corresponding internal volume, thereby providing the requisite mapping needed to express the file in the form of a volume.

The replication splitter 226 sits above the volume-file mapping 228. The replication splitter 226 is configurable by the replication session manager 162 on a per-data-object basis to intercept IO requests and to replicate the data specified to be written in such requests according to data-object-specific settings. Depending on the data object to which the IO request is directed and the replication settings defined for that object, the replication splitter 226 may allow IO requests it receives to pass through to the volume-file mapping 228 unimpeded (e.g., if no replication is specified for that data object). Alternatively, the replication splitter 226 may intercept the IO request, forward the request to the replication appliance 160, and hold the request until the replication splitter 226 receives an acknowledgement back from the replication appliance 160. Once the acknowledgement is received, the replication splitter 226 may allow the IO request to continue propagating down the IO stack 140. It should be understood that the replication session manager 162 can configure the replications splitter 226 in a variety of ways for responding to different types of IO requests. For example, replication session manager 162 can configure the replication splitter 226 to operate in a pass-through mode for control IOs and for IO requests specifying data reads. In some situations, the replication session manager 162 can configure the replication splitter 226 to intercept reads as well as writes. In any such situations, the replication session manager 162 can configure the replication splitter 226 on a per-data-object basis.

The object-volume mapping layer 224 maps internal volumes to respective data objects, such as LUNs, host file systems, and vVOLs. Mapping underlying volumes to host-accessible LUNs may simply involve a remapping operation from a format compatible with the internal volume to a format compatible with the LUN. Mapping internal volumes to host file systems, however, may be accomplished in part by leveraging from the fact that file systems are customarily built upon volumes, such that an underlying volume is part of the structure of a host file system. Host file systems, also called "upper-deck file systems," are thus built upon the internal volumes presented by the volume-file mapping 228 to provide hosts with access to files and directories. Mapping of vVOLs can be achieved in similar ways. For block-based vVOLs, the object-volume mapping layer 224 may perform mapping substantially as it does for LUNs. File-based vVOLs may be mapped, for example, by converting host-specified offsets into vVOL files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based vVOLs) using Fiber Channel or iSCSI and may expose file-based objects (e.g., host file systems, file-based vVOLs, and VMDKs) using NFS, CIFS, or SMB 3.0, for example.

In operation, the IO stack 140 receives an IO request 112 specifying data to be written to a particular data object. The object-volume mapping 224 maps the IO request 112 to a block-based request 112a directed to an internal volume. The replication splitter 226 may intercept the block-based request 112a and send the block-based request 112a to the replication appliance 160 (or may pass through the IO request, depending on settings established by the replication session manager 162 for the data object). Assuming the replication splitter 226 intercepts the block-based request 112a, the replication appliance 160 coordinates with other components to replicate the data specified in the block-based request 112a at a second site and provides the replication splitter 226 with an acknowledgement. When the replication splitter 226 receives the acknowledgement, the replication splitter 226 allows the block-based request 112a to continue propagating down the IO stack 140. The volume-file mapping 228 maps the block-based request 112a to one that is directed to a particular file of a lower-deck file system, and the back end 144 and storage 180 process the IO request by writing the specified data to actual media. In this manner, the IO stack 140 supports both local storage of the data specified in the IO request 112 and replication at a second site.

Figure 3:
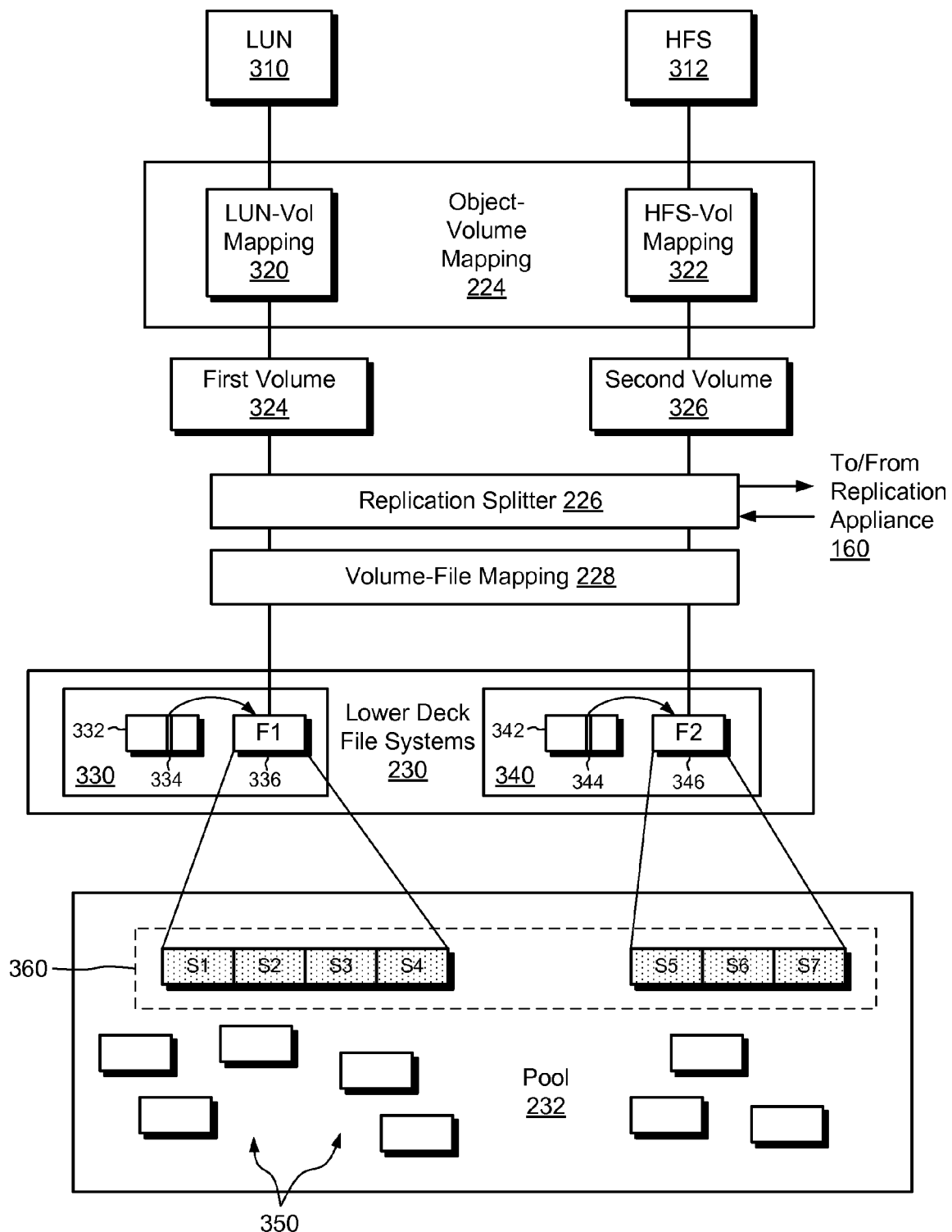
FIG. 3 is a block diagram showing example features of the IO stack of FIG. 2 in additional detail.

FIG. 3 shows portions of the front end 142 in additional detail. Here, data objects include a LUN 310 and an HFS (host file system) 312. The object-volume mapping 224 includes a LUN-to-Volume mapping 320 and an HFS-to-Volume mapping 322. Using the approach described above, the LUN-to-Volume mapping 320 maps the LUN 310 to a first volume 324, and the HFS-to-Volume mapping 322 maps the HFS 312 to a second volume 326. The replication splitter 226 may intercept IOs in accordance with settings established by the replication session manager 262 (as described above). The Volume-to-File mapping 228 maps the first and second internal volumes 324 and 328 to respective files 336 (F1) and 346 (F2) in respective lower-deck files systems 330 and 340. Through the various mappings, any set of blocks of the LUN 310 specified in an IO request 112 is mapped to a corresponding set of blocks within the first file 336. Similarly, any file or directory of the HFS 312 specified in an IO request 112 is mapped to a corresponding set of blocks within the second file 346.

The lower-deck file system 330 includes an inode table 332, and the lower-deck file system 340 includes an inode table 342. An inode 334 provides file-specific information about the first file 336, and an inode 344 provides file-specific information about the second file 346. The information stored in each inode includes location information (e.g., block locations) where data of the respective file are stored.

Although a single file is shown for each of the lower-deck file systems 330 and 340, it is understood that each of the lower-deck file systems 330 and 340 may include any number of files, with each having its own entry in the respective inode table. In one example, each lower-deck file system stores not only the file F1 or F2, but also snaps of those files, and therefore snaps of the data objects the files store. For example, the first lower-deck file system 330 stores the first file 336 representing the LUN 310 along with a different file for each snap of the LUN 310. Similarly, the second lower-deck file system 340 stores the second file 346 representing the HFS 312 along with a different file for every snap of the HFS 312.

As shown, the storage pool 232 allocates slices 360 for providing storage for the first file 336 and the second file 346. In the example show, slices S1 through S4 store the data of the first file 336, and slices S5 through S7 store the data of the second file 346. The data that make up the LUN 310 are thus stored in the slices S1 through S4, whereas the data that make up the HFS 312 are stored in the slices S5 through S7.

II) Synchronous Replication of Block-Based Objects and File-Based Objects:

Example techniques for performing synchronous replication on both block-based objects and file-based objects will now be described in connection with FIGS. 4-6. As is known, "synchronous" replication refers to replication performed in band with IO requests 112 as the IO requests arrive. With synchronous replication, individual IO request data are generally persisted to a replica site on an individual basis, e.g., one-by-one, as the IO requests arrive. In contrast, "asynchronous" replication is performed out of band with individual IO requests, with replicas generated, for example, on demand, at regular intervals, and/or in response to particular events.

Figure 4:
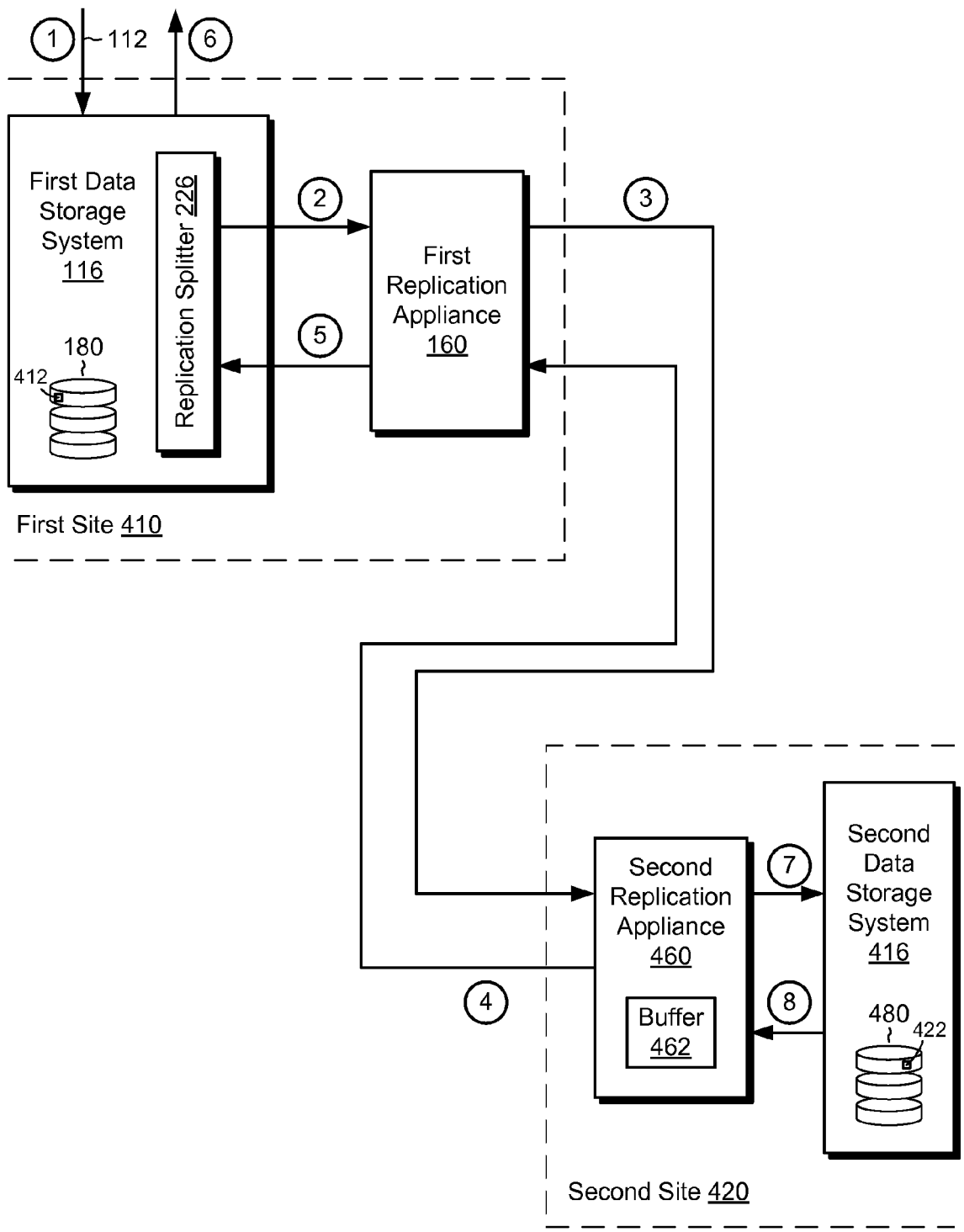
FIG. 4 is a block diagram showing synchronous replication between a first data storage system at a first site and a second data storage system at a second site.

FIG. 4 shows an example arrangement for performing synchronous replication of a data object 412 from a first data storage system 116 (as shown in FIG. 1) to a second data storage system 416. Here, the first data storage system 116 is located at a first site 410 and the second data storage system 416 is located at a second site 420. In an example, the first site 410 and the second site 420 are located at different geographical locations, such as in different buildings of a city or campus. The second data storage system 416 includes persistent storage 480 (e.g., disk drives, flash drives, and the like) and is operatively connected to a second replication appliance 460. The second replication appliance 460 includes a buffer 462, which may be implemented in non-volatile memory (e.g., on disk or flash drives). In some examples, the buffer 462 is implemented in high-speed non-volatile memory within the storage 480, but separate and apart from any replica storage. Further, the second replication appliance 460 may be included entirely within the second data storage 116, similar to the way in which the first replication appliance 160 is included within the first data storage system 116 (see FIG. 1). Although the components at the first site 410 and the second site 420 are shown to be different, they may alternatively be the same, so as to provide symmetrical behavior, with each site storing a replica of data objects from the other. As shown in this example, however, the first site 410 acts to receive and process IO requests 112 from hosts, whereas the second site 420 acts to provide a replica 422 of the data object 412 on the first site 410.

The encircled numbers in FIG. 4 identify an example sequence of events. At (1), the first data storage system 116 receives an IO request 112 specifying data to be written in the storage 180 for a particular data object 412 (e.g., a LUN, a host file system, a vVOL, etc.). The IO request 112 propagates down the IO stack 140 (FIG. 2) and encounters the replication splitter 226. The replication splitter 226 intercepts the IO request and temporarily prevents the IO request from propagating further down the IO stack 140 (FIG. 2). At (2), the replication splitter 226 sends the IO request (e.g., a version thereof) to the first replication appliance 160. At (3), the first replication appliance 160 forwards the IO request to the second replication appliance 460, which stores the data specified in the IO request in the buffer 462. At (4), the second replication appliance 460 acknowledges safe storage of the IO data to the first replication appliance 160 (e.g., that the IO data are persisted in the buffer 462). At (5), the first replication appliance 160 in turn acknowledges receipt to the replication splitter 226. Only when the replication splitter 226 receives the acknowledgement does the replication splitter 226 allow the IO request to continue propagating down the IO stack 140 (FIG. 2) to complete the write operation to the storage 180. At (6), the first data storage system 116 acknowledges completion of the IO request 112 back to the originating host. Asynchronously with the IO request, the second replication appliance 460 may de-stage the buffer 462 to the replica 422 of the data object maintained in the storage 480. For example, at (7), the data specified in the IO request are transferred from the buffer 462 to the storage 480, and at (8), the second data storage system acknowledges completion.

Many variants are contemplated. For example, the buffer 462 may be realized using volatile memory (e.g., RAM). In such cases, the second replication appliance 460 may wait to acknowledge a write to the first replication appliance 160 until it receives confirmation that the data specified in the IO request has been persisted in the replica 422 for the data object 412 in the storage 480.

As described, the first data storage system 116 conducts synchronous replication with the second data storage system 416 on a per-data-object basis and in accordance with object-specific settings. The replication session manager 162 establishes these settings and orchestrates replication activities, recovery activities, and failover activities. In an example, the GUI application 164 provides an entry point to the replication session manger 162 to allow users to specify object-specific settings. In some examples, the GUI application is configured to accept user input for managing a wide range of operations of the data storage system 116, including configuring pools, configuring block-based objects, and configuring file-based objects, as well as for managing replication. Although particular aspects of the GUI application 164 are described herein in relation to replication, it is understood that the GUI application 164 may have a much greater scope than for controlling replication alone. For example, in some implementations, the GUI application 164 is a modified form of the Unisphere integrated management tool, available from EMC Corporation of Hopkinton, Mass. Providing the GUI application 164 within Unisphere simplifies the user experience by avoiding for the user to operate a separate GUI for controlling replication.

Figure 5:
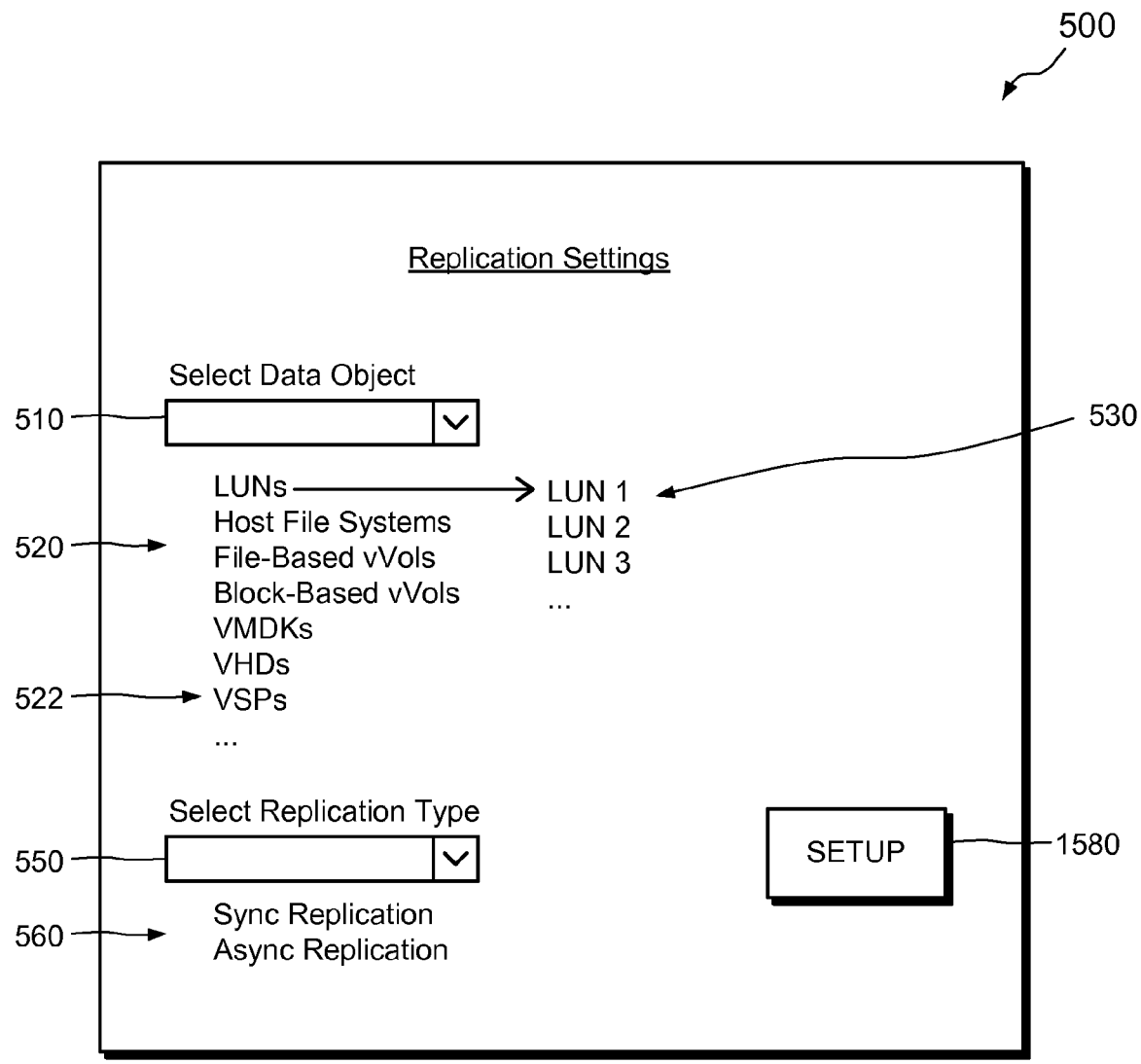
FIG. 5 is an example screen generated by a graphical user interface (GUI) application for establishing replication settings of data objects on a per-data-object basis.

FIG. 5 shows an example screen shot 500 of the GUI application 164 that allows users to specify object-specific replication settings. It is understood that the screen 500 is shown in simplified form and is intended to be merely illustrative. Here, the screen 500 includes a control 510 for selecting a desired data object. In an example, a user clicks the control 510 to reveal a list of available objects. The control 510 may organize the data objects in multiple levels, e.g., in a first level 520 that lists different types of data object (e.g., LUNs, Host File Systems, etc.) and in a second level 530 that lists particular data objects of a type the user selects from the first level 520 (e.g., LUN 1, LUN 2, etc.). In an example, the GUI application 164 queries the configuration database 170 and/or other databases to obtain lists of available data objects and stores such lists in connection with the control 510. A user may click the control 510 to display a list of object types objects in the first level 520. The user may then and click a desired type from the list displayed at first level 520 to cause the control 510 to display a list of data objects of the selected type in the second level 530. A different list is displayed in the second level 530 for each selection in the first level 520. The user may then click a particular listed data object to establish configuration settings for that object. For example, the user may click "LUNs" from the first level 520 and then click "LUN 2" from the second level 530 to configure settings for LUN 2.

The user may next click a control 550 to select a particular data protection operation. List 560 appears when the user clicks the control 550 and displays example options. These include, for example, "Synch Replication" for synchronous replication and "Async Replication" for asynchronous replication. The user may the click a button 580 ("SETUP") to configure settings for the selected replication type (selected via control 550) on the selected data object (selected via control 510).

Figure 6:
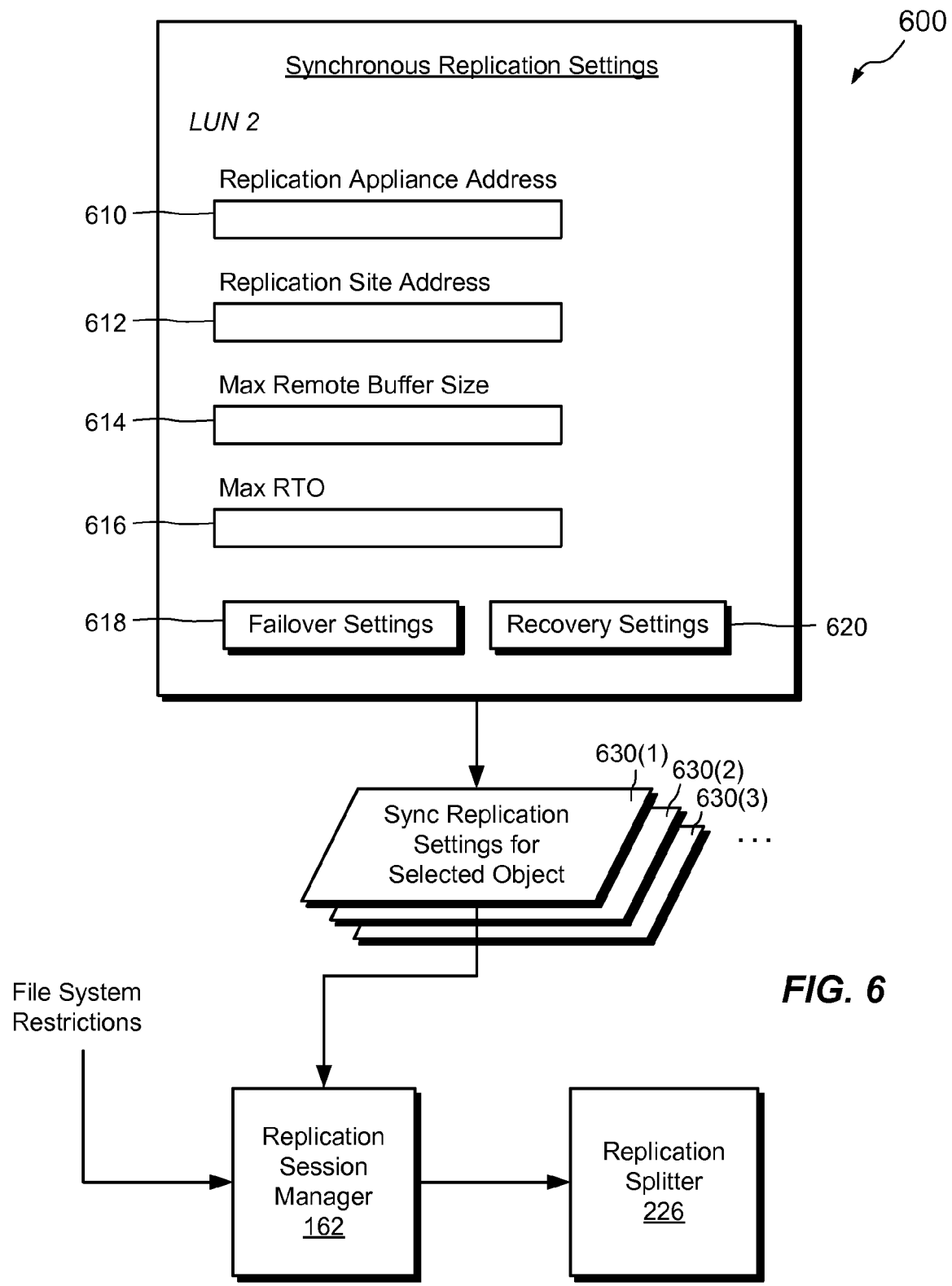
FIG. 6 is another example screen generated by the GUI application for establishing additional settings on a per-data-object basis.

FIG. 6 shows an example screen 600 of the GUI application 164, which the GUI application displays, for example, when the user selects "LUN 2" with the control 510 and selects "Sync Replication" from the control 550 (FIG. 5). The GUI application 164 thus accepts user input, via the screen 600, for establishing synchronous replication settings specific to LUN 2. It is understood that the screen 600 can be configured to accept settings for different data objects when the user selects them, e.g., using the control 510. Also, different screens may be displayed when the user selects different replication types (e.g., using the control 550).

The screen 600 accepts a number of different replication settings. These include, for example, the following settings:
Replication Appliance Address (610): The address (e.g., SCSI or IP address) of the replication appliance 160. Different replication appliance addresses may be provided for different data objects. For example, multiple replication appliances (like the appliance 160) may be connected to the data storage system 116 over a SAN (storage area network) or other network. Assigning different replication appliance addresses to different data objects causes different replication appliances to be used for replicating the respective objects. In some examples, replication appliances are arranged into clusters. In such cases, the Replication Appliance Address 610 may designate a cluster address. Where a cluster address is specified, the replication splitter 226 may select individual appliance units within a cluster based on load, for example. If the replication appliance is embedded on an SP, the Replication Appliance Address 610 provides an identifier of the replication appliance running on the SP and a designation of an interface used for communicating with the appliance (e.g., SCSI over direct API, SCSI over IPC, etc.).

Replication Site Address (612): The address (e.g., IP address) of a data storage system or a replication appliance at a second site. In the example of FIG. 4, the replication site address can be the address of the second replication appliance 460 or the address of an SP running on the second data storage system 416.

Max Remote Buffer Size (614): The maximum amount of data that may be stored in a buffer at the second site. In the example of FIG. 4, the Max Remote Buffer Size refers to the amount of data in the buffer 462 from IO requests 112 that have not yet been committed to the replica 422 in the storage 480. By setting Max Remote Buffer Size 614 to a large value, a considerable amount of time may be required to de-stage data to the replica 422 in the storage 480 to bring the replica 422 up to date with the data object at the first site 410. By setting Max Remote Buffer Size 614 to a small value, little time is needed to commit pending data, such that the replica 422 is kept nearly up to date with the original object at all times.

Max RTO (616): The maximum amount of time (Recovery Time Objective) that the data object may remain unavailable to hosts after the data object becomes unavailable at its source. In the example of FIG. 4, the Max RTO 616 is the maximum amount of time that is allowed to pass after a failure at the source before the replica of the data object in the storage 480 is brought up to date with the source and made available to hosts. In general, the more uncommitted 10 requests that are pending in the buffer 462, the greater amount of time required to activate the replica. Therefore, an effective way to reduce RTO is set the Max Remote Buffer Size 614 to a small value. As Max RTO 616 is closely related to Max Remote Buffer Size 614, some implementations may not offer the option to control both.

The example settings 610, 612, 614, and 616 are shown for illustrative purposes. It is understood, however, that the particular settings shown are not necessarily required nor are they intended to represent all possible settings that may be desired.

The screen 600 is further seen to include buttons 618 and 620, for establishing failover settings and recovery settings, respectively, for the selected data object. In an example, clicking the button 618 brings up a failover screen (not shown) for accepting user input to establish failover settings for the data object. Failover settings may include, for example, an address of a failover site, a maximum allowable amount of data loss (RPO), a maximum RTO, as above, as well as other settings. Clicking the button 620 may bring up a recovery screen (not shown) for accepting user input to establish recovery settings for the selected data object. Recovery settings may include, for example, a recovery destination (e.g., a location to which a replica is to be restored), as well as maximum RPO and RTO settings to be applied for recovery operations.

Although the screens 500 and 600 have been shown and described in connection with a particular data object (LUN 2), it should be understood that similar screens may be presented for other LUNs, and for other types of data objects, with the screens 500 and 600 accepting user settings for any currently selected object. Thus, the GUI application 164 may be used for establishing replication, failover, and recovery settings on a per-data-object basis, with each data object having its own respective settings.

As further shown in FIG. 6, the GUI application 164 may generate output providing sync replication settings for the selected object. For example, the GUI application 164 may gather all user-established settings specified in the screens 500 and 600 (as well as any settings gathered from the failover screen and/or recovery screen) and provide such object-specific settings in an output file 630(1). Additional output files (e.g., 630(2), 630(3), . . . ) may be provided for other data objects, e.g., one per data object. It should be readily apparent, however, that object-specific settings may be stored in any suitable way, such as in different files (as shown), as a single file (e.g., an XML file), as records in a database, or in any number of other ways. In any case, the GUI application 164 sends the object-specific settings to the replication session manager 162, which receives the settings and applies them to establish replication sessions with replica sites for each data object in accordance with its respective settings. In this manner, the GUI application 164 may act as a single entry point to the replication session manager 162 for controlling replication on a per-object basis.

The replication session manager 162 may orchestrate any number of replication sessions at any given time, with each replication session operating to replicate a respective data object. For each replication session, the replication session manager 162 communicates with a respective replica site (e.g., with a counterpart replication session manager at the replica site) and coordinates replication activities in accordance with the object-specific settings. In the event of a failure at the data storage system 116 that renders a data object or the entire data storage system 116 unavailable, the replication session manager at the replica site can orchestrate failover and/or recovery operations in accordance with the same settings established in the replication session manager 162 on the data storage system 116.

As further shown in FIG. 6, the replication session manager 162 may also receive information describing file system restrictions. These restrictions may apply to upper-deck file systems. They may also apply to lower-deck file systems, i.e., to the file systems in which the file realizations of the data objects themselves are stored (FIGS. 2 and 3). Any of such file systems may operate subject to restrictions, such as restrictions prohibiting deletion prior to a certain date. These restrictions may include File Level Retention for compliance (FLR-C) and/or File Level Retention for enterprises (FLR-E). When restriction information is provided for a particular data object, the replication session manager 162 receives the information and includes it with the object-specific settings for the data object. When replication is conducted on the object, the replica site obtains the restriction information and applies the identified restrictions to the replica. The replica is thus made subject to the same restrictions as the original object.

Although the GUI application 164 accepts user input for establishing various replication settings for a data object, the replication session manager 162 may, in some examples, generate synchronous replication settings for a data object on its own, automatically, and without user input, and initiate a replication session for the data object with a destination object in accordance with the automatically generated settings. Thus, replication may proceed on a data object even if a user does nothing to establish replication settings.

Once the replication session manager 162 receives object-specific replication settings for a particular data object, the replication session manager 162 configures the replication splitter 226 (FIGS. 2-4) to operate in accordance with the settings for the respective object. In an example, the replication session manager 162 identifies a particular internal volume (FIGS. 2 and 3) in the IO stack 140 that the object-volume mapping 224 maps to the data object. The replication session manager 162 then activates the replication splitter 226 on the identified volume. Then, whenever the replication splitter 226 receives an IO request specifying data to be written to the internal volume mapped to the data object, the replication splitter 226 performs replication activities in accordance with the settings for the data object. These include, for example, sending the IO request to the replication appliance 160 designated in the settings for the object, configuring the buffer (e.g., 462), and so forth. Because the replication splitter 226 recognizes volumes and because the replication session manager 262 can identify the internal volume for each data object, the replication splitter 226 and the replication manager 262 can together manage replication on a per-data-object basis.

As described in this section above, synchronous replication is performed on both block-based objects and file-based objects. Such synchronous replication may be used in connection with a data storage system 116 that internally stores data objects (e.g., LUNs, file systems, block-based vVOLs, file-based vVOLs, VMDKs, etc.) in the form of respective files (e.g., files 336, 346), such that each file provides a realization of a data object. The data storage system 116 maps each such file to a respective logical volume (e.g., 324, 326), and each logical volume provides a block-based interface. As the data storage system receives IO requests 112 (e.g., from hosts 110(1) to 110(N)) specifying data to be written to a data object, the data storage system 116 renders the IO requests as block-based requests, regardless of whether the IO requests are themselves block-based or file-based. A block-based replication splitter intercepts the block-based requests directed to the logical volumes and performs block-based, synchronous replication on the block-based requests, thereby achieving synchronous replication of both block-based objects and file-based objects in a single, unified architecture.

III) Example Synchronous Replication of Both Block-Based Objects and File-Based Objects Using an Embedded Replication Appliance:

Example techniques will now be described with reference to FIGS. 7-17 for operating a storage processor with an embedded replication appliance.

Figure 7:
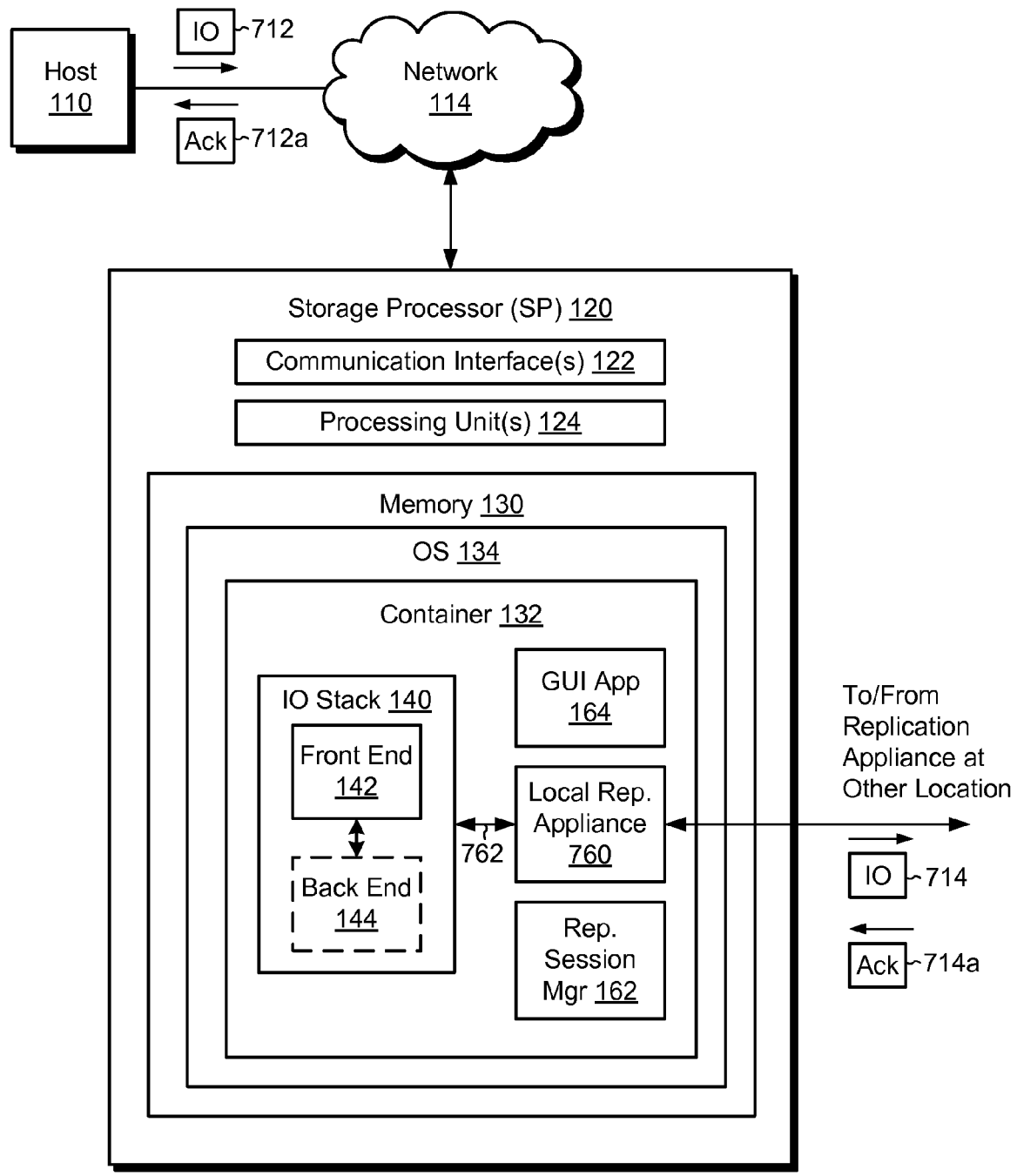
FIG. 7 is a block diagram showing parts of the example environment of FIG. 1 but including a local replication appliance running within a container on the storage processor of the data storage system.

FIG. 7 shows portions of the environment 100, but with the replication appliance 160 replaced with a local replication appliance 760 embedded within the SP 120. In an example, the local replication appliance 760 is realized as a software construct that performs functions similar to those of conventional, hardware replication appliances. The local replication appliance 760 exposes an API (application programming interface), which provides methods that other software constructs can access to communicate with and operate the local replication appliance 760.

As shown, the local replication appliance 760 runs within the same container 132 as the IO stack 140, such that a communication pathway 762 is established using conventional software techniques (e.g., API references, pointer passing, etc.) and without the need for IPC. Communication over the pathway 762 uses SCSI semantics, with SCSI instructions embedded within API calls.

As described above in Section I, the IO stack 140 is configured to map IO requests specifying reads and writes of block-based user objects and file-based user objects to reads and writes of files representing the respective user objects in a set of internal file systems of the data storage system. The local replication appliance 760 is configured to communicate with the IO stack 140 operating on the storage processor 120 to synchronously replicate data specified in write IO requests received by the storage processor 120 to another location.

It is understood that the local replication appliance 760 can perform all the same replication activities as the replication appliance 160 described above. In typical operation, an IO request 712 arriving from a host 110 specifies a write operation for writing current data for a user object, such as a LUN, vVOL, or file system, for example. The IO request 712 arrives at the SP 120 and at the front end 142 of the IO stack 140. The replication splitter 226 (FIG. 2) intercepts the IO request 712, and the replication splitter 226 forwards a block-based version of the IO request 714 to the local replication appliance 760, e.g., using SCSI instructions over API calls via the pathway 762. The local replication appliance 760, working alone or in connection with other replication appliances, sends the block-based request 714 to a replication appliance at another location, e.g., at a remote site, although the other location may be anywhere. The local replication appliance 760 receives an acknowledgement 714a back from the remote replication appliance, confirming that the current data specified in the IO request 714 have been persisted at the remote location. The local replication appliance 760 acknowledges back to the replication splitter 226, which permits the IO request to resume propagating down the IO stack 140. The data storage system 116 stores the current data (e.g., in the storage 180—see FIG. 1), and the SP 120 sends an acknowledgement 712a back to the host 110 to confirm that the write operation was completed.

In the example shown, the local replication appliance 760 is operated within the same container 132 as the IO stack 140. This is not required, however. For example, a local replication appliance, or multiple such appliances, may be operated within a different container running on the SP 120. When the IO stack 140 and the replication appliance(s) are run in different containers, IO stack 140 and the replication appliance(s) may communicate with each other using IPC, again using SCSI to provide the underlying semantics.

Figure 8:
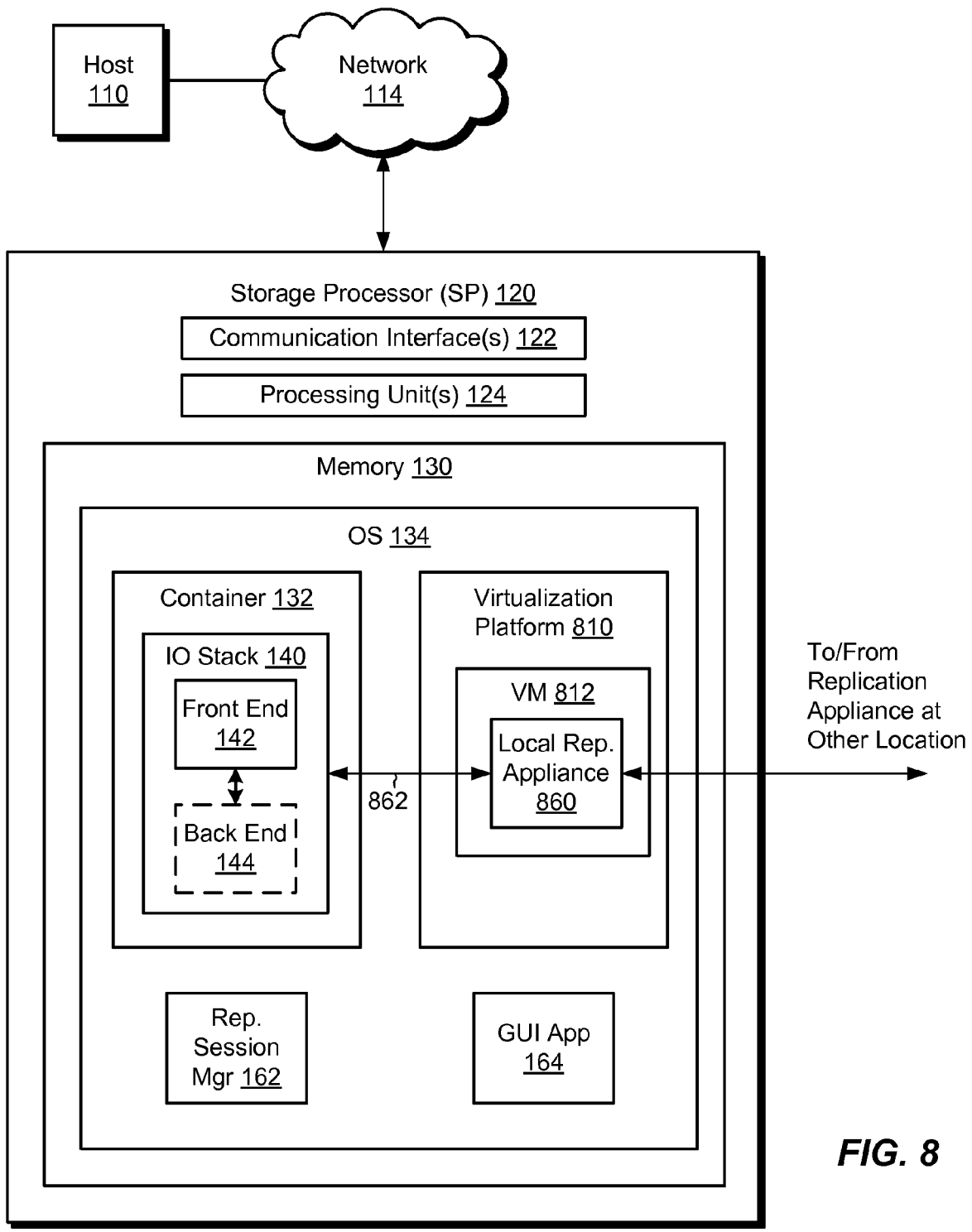
FIG. 8 is a block diagram showing parts of the example environment of FIG. 1 but including a local replication appliance running on a virtual machine within a virtualization environment on the storage processor of the data storage system.

FIG. 8 shows another example arrangement. Here, a local replication appliance 860 runs within a virtual machine 812 on a virtualization platform 810. The local replication appliance 860 performs functions similar to those described above for the replication appliances 160 and 760. As the virtualization platform 810 is disposed outside the container 132, however, the local replication appliance 860 and the IO stack 140 communicate using SCSI over IPC, e.g., via pathway 862. Although the replication session manager 162 and GUI application 164 are shown outside any container, this is merely an implementation choice. The SP 120 may alternatively operate these constructs within the container 132, in a different container, or on one or more virtual machines running on the virtualization platform 810.

In an example, the virtualization platform 810 is KVM (Kernel-based Virtual Machine) running under Linux; however, this is not required. Other virtualization platforms include Microsoft Hyper-V and VMware ESX, for example.

Figure 9:
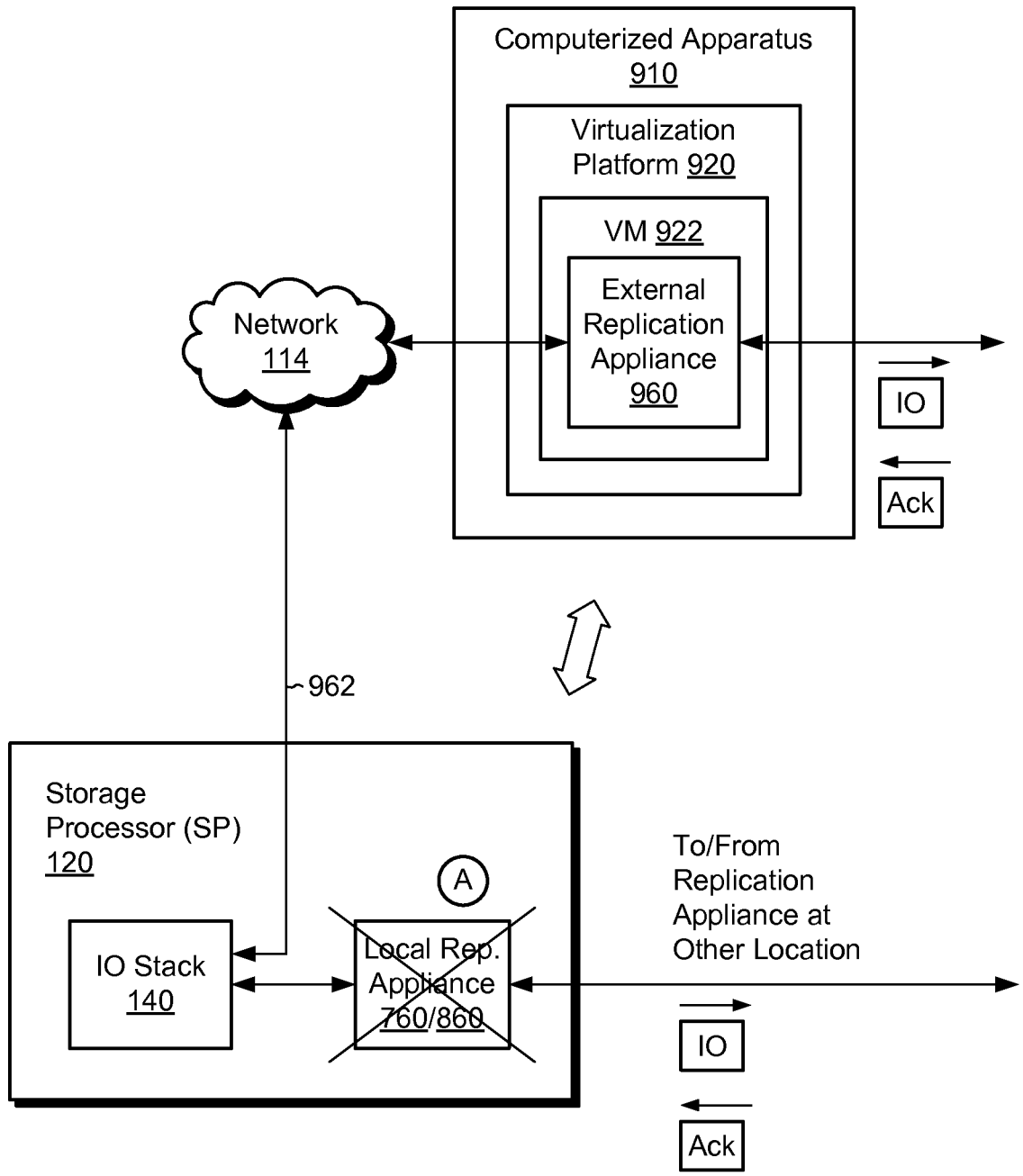
FIG. 9 is a block diagram showing example migration of a local replication appliance running on the storage processor of the data storage system to an external replication appliance running within a virtual machine on a computerized apparatus external to the storage processor.

FIG. 9 shows an example migration path from a local replication appliance to one that runs externally to the SP 120 and communicates with the IO stack 140 over the network 114. Although embedding replication appliances within an SP reduces network activity and cost, customers may eventually outgrow this solution and need to upgrade to more powerful, external replication appliances that can provide greater throughput and bandwidth.

Here, an embedded replication appliance (e.g., 760 or 860) is migrated to an externally replication appliance 960 that runs within a virtual machine 922. The virtual machine 922 runs on a virtualization platform 920, which in turn runs on an external computerized apparatus 910. In an example, the virtualization platform 922 is ESX from VMware; however, KVM, Hyper-V or other virtualization platforms may also be used.

Migration preferably proceeds transparently and without disrupting ongoing replication sessions. If the embedded replication appliance runs within a virtual machine on the SP 120, then the embedded virtualization platform 810 (FIG. 8) and the external virtualization platform 920 may coordinate to perform live migration and seamlessly move the virtual machine 812 to the virtualization platform 920, where it continues to operate as the virtual machine 922. Communications between the replication splitter 226 and the external replication appliance 960 proceeds over path 962 to support synchronous replication mirroring to a remote replication appliance at a remote location.

If live migration is not supported or if the embedded replication appliance is not implemented as a virtual machine (as in FIG. 7), then some disruption may occur, but such disruption is generally limited to a few seconds or less. In an example, migration proceeds by adding the external replication appliance 960 to a replication appliance cluster along with the embedded replication appliance 760/860. The migration process then moves ownership of any consistency groups owned by the embedded replication appliance 760/860 to the external replication appliance 960 and instructs the replication splitter 226 (FIG. 2) to direct write IOs to the external replication appliance 960 over the path 962 for mirroring. In some examples, the movement of a consistency group between appliances can be done without stopping synchronous replication, but rather by briefly pausing IO requests at the splitter 226 (typically for only a few milliseconds) and then resuming IO requests once the replication task has moved to the appliance 960. A "consistency group" is a set of volumes that the data storage system manages together as a group. For example, a consistency group may be managed as a single unit for purposes of failover and migration. Once the external replication appliance 960 takes ownership of all consistency groups owned by the embedded replication appliance 760/860, the embedded replication appliance 760/860 may be taken offline. Synchronous replication of data writes may proceed by the splitter 226 in the IO stack 140 directing write requests to the external replication appliance 960 over the network 114 to mirror data to the remote location.

Although FIG. 9 shows an external replication appliance implemented with a virtual machine (922), it is understood that the external replication appliance may alternatively be implemented as a special-purpose replication appliance, such as those used in conventional synchronous replication solutions. Also, customers may upgrade in stages, first by migrating from an embedded replication appliance 760/860 to one hosted by a virtual machine, and later by migrating from the virtual machine to a special-purpose replication appliance. Further, customers may wish to migrate from higher-performance to lower-cost solutions by moving from a special-purpose replication appliance to an external virtual machine-based appliance, and later by moving from the external virtual machine-based appliance to an embedded one. Thus, migration may be conducted in either direction.

In some examples, the IO stack 140 has settings that identify the location of the replication appliance and its type (e.g., whether it is embedded within the container 132, embedded on a virtual machine, provided externally on a virtual machine, or provided externally on special-purpose hardware). Such settings may be stored, for example, in the Replication Appliance Address 610 (FIG. 6). The IO stack 140 discovers these settings and takes appropriate action when mirroring IO requests. For example, if the 10 stack 140 detects that the replication appliance is embedded within the container 132, the IO stack 140 effects communication with the replication appliance using SCSI over API calls (e.g., via references and pointer passing). If the IO stack 140 detects that the replication appliance is embedded within a virtual machine on the SP, the IO stack 140 effects communication with the replication appliance using SCSI over IPC. Further, if the IO stack 140 detects that the replication appliance is provided externally, the IO stack 140 communicates with the replication appliance using SCSI over wire (e.g., Fibre Channel, InifiBand, iSCSI, etc.).

Figure 10:
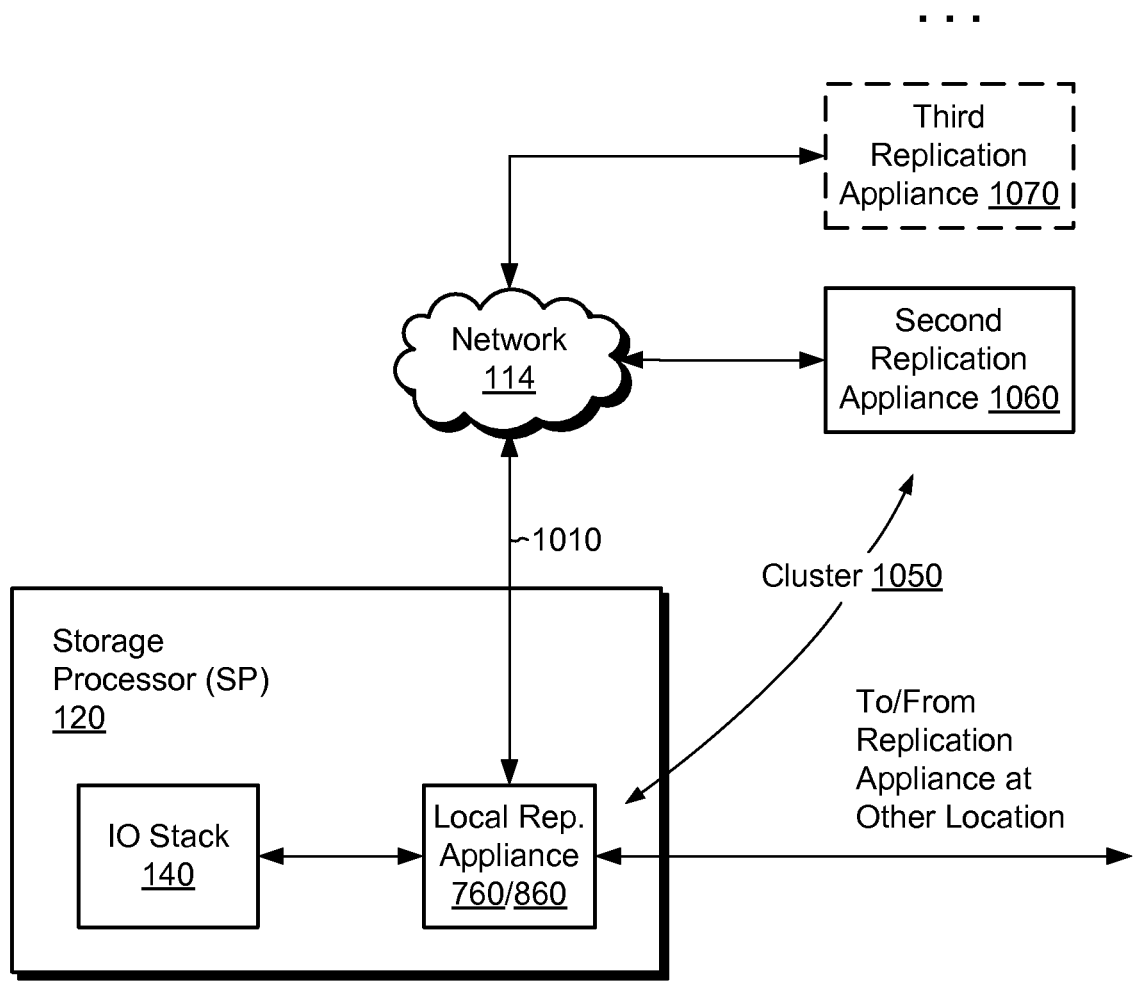
FIG. 10 is a block diagram showing an example replication appliance cluster formed among a local replication appliance running on the storage processor and one or more external replication appliances external to the storage processor.

FIG. 10 shows an example arrangement in which an embedded local replication appliance 760/860 forms a replication appliance cluster 1050 with a second replication appliance 1060 and (optionally) with a third replication appliance 1070 (and more if desired). In an example, the second and third replication appliances 1060 and 1070 run within one or more virtual machines (e.g., as shown in FIG. 9); however, the second and third replication appliances 1060 and 1070 (or either of them) may alternatively be provided as conventional, special-purpose machines.

The replication appliance cluster 1050 defines a group of replication appliances that can perform load balancing and support failover from any appliance to any other appliance in the cluster. If an appliance that is the owner of a particular consistency group fails, another appliance in the cluster automatically takes ownership of the consistency group and allows synchronous replication sessions seamlessly to proceed.

In some examples, replication appliance clusters allow ownership of consistency groups to be shared among multiple replication appliances. According to some variants, IO requests directed to a particular consistency group are always sent to a particular replication appliance that is designated as a master. The master can then delegate IO request mirroring operations to any other replication appliance in the cluster with which ownership of the consistency group is shared. According to other variants, IO requests directed to a particular consistency group can be sent for mirroring to any replication appliance that shares ownership of a consistency group, with no master being required.

In the example of FIG. 10, the IO stack 140 communicates with the local replication appliance 760/860 only, with the replication appliance 760/860 communicating with the second and third replication appliances 1060 and 1070 over the network 114 via pathway 1010. In response to the IO stack 140 receiving an IO request specifying data to be written to a user object internally represented as a file in the data storage system, the IO stack 140 forwards the data to the local replication appliance 760/860 and the replication appliance cluster 1050 mirrors the data to the other remote location. If the local replication appliance 760/860 solely owns the consistency group to which the IO request is directed, the local replication appliance 760/860 performs the mirroring operation to the remote location. If ownership of the consistency group is shared, however, any of the replication appliances in the cluster 1050 may perform the mirroring operation to the remote location.

Figure 11:
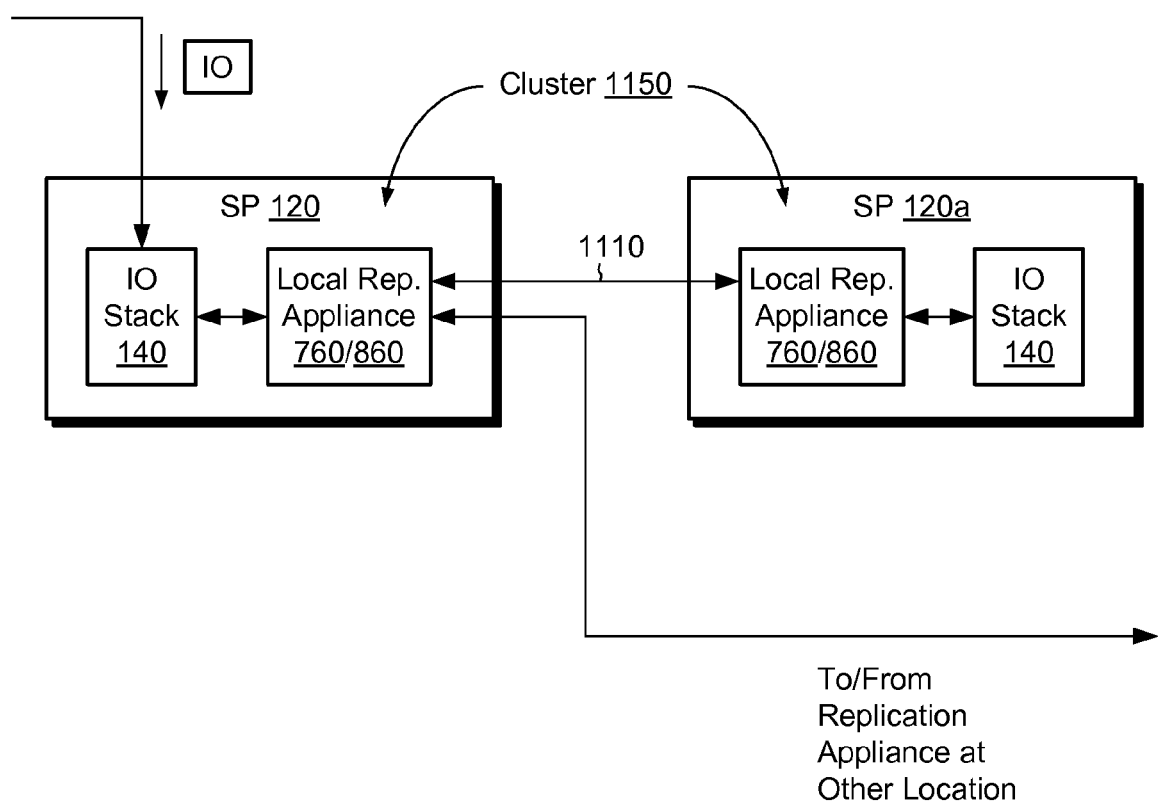
FIG. 11 is a block diagram showing an example replication appliance cluster formed among two or more storage processors of the data storage system.

FIG. 11 shows an example arrangement in which multiple SPs 120 and 120*a* each operate a respective IO stack 140 and a respective local replication appliance 760/860. In the example shown, the two SPs 120 and 120*a* form an SP pair, which are connected together via a high-speed bus 1110, which may be implemented with CMI or PCI Express, for example.

The local replication appliances 760/860 of the two SPs form a replication appliance cluster 1150. Thus, clusters of replication appliances may be formed among local replication appliances running within storage processors of a data storage system. Although the example of FIG. 11 shows two SPs, any number may be provided, with the local replication appliances 760/860 of any of the SPs belonging to the cluster 1150. Also, although each of the SPs 120 and 120*a* is seen to include only one local replication appliance 760/860, each SP may alternatively include multiple local replication appliances 760/860. When multiple local replication appliances 760/860 are run together on an SP, the appliances may belong to the same cluster, although this is not required. Some local replication appliances 760/860 may belong to one cluster whereas another belongs to another cluster. Some may belong to no cluster. In addition, any of the local replication appliances 760/860 may form clusters with other embedded replication appliances or with external replication appliances of any type, including those which run in virtual machines and/or those provided as conventional special-purpose replication appliances.

Figure 12A:
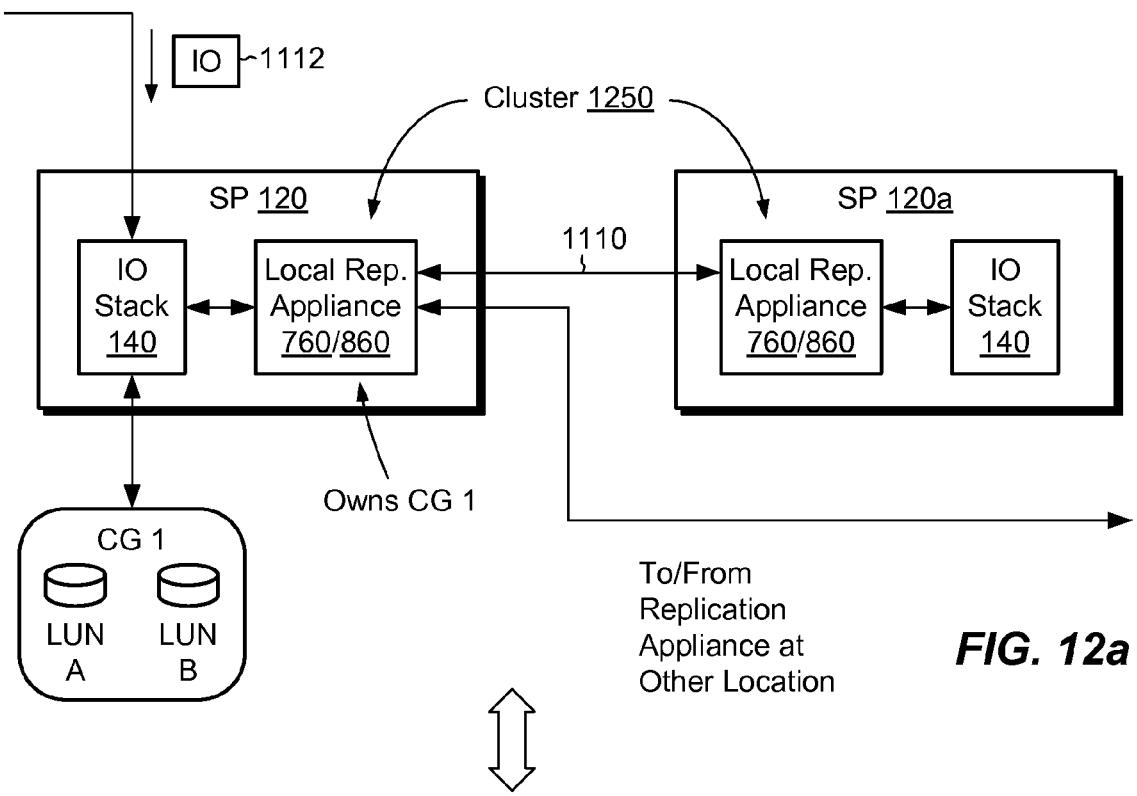
FIGS. 12*a* and 12*b* are block diagrams showing an example failover and failback scenario between two storage processors of the data storage system.
Figure 12B:
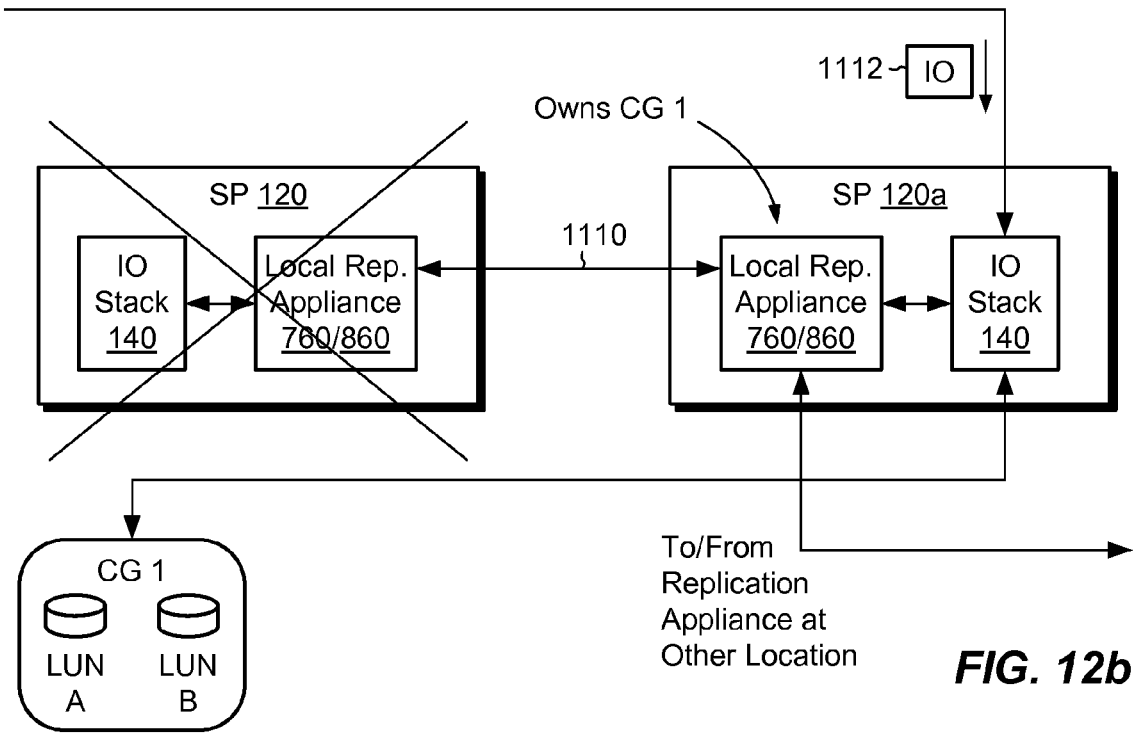

FIGS. 12*a* and 12*b* show an example failover/failback arrangement between a pair of SPs 120 and 120*a* each running a respective local replication appliance 760/860, where the two local replication appliances belong to a cluster 1250. Here, the local replication appliance running on the SP 120 owns a consistency group CG 1, which consists of two LUNs, i.e., LUN A and LUN B.

Prior to failure of SP 120, as shown in FIG. 12*a*, the IO stack 140 on SP 120 receives IO requests 1112 specifying writes to the LUNs in CG 1 and communicates with the local replication appliance 760/860 on SP 120 to mirror data specified in the 10 requests 1112 to the remote site.

Upon a failure of SP 120, as shown in FIG. 12*b*, the local replication appliance 760/860 on SP 120*a* automatically takes ownership of CG 1 to resume operation. The IO stack 140 on SP 120*a* receives IO requests 1112 specifying writes to CG 1 and communicates with the local replication appliance 760/860 on SP 120*a* to mirror data specified in the IO requests 1112 to the remote location.

In some examples, the local replication appliance 760/860 on SP 120*a* is not created until after the failure in SP 120 occurs. Upon such failure, the SP 120*a* creates the local replication appliance 760/860 on SP 120*a* and causes it to join the consistency group 1250. The local replication appliance 760/860 on SP 120*a* then takes ownership of CG 1 and proceeds to process the IO requests 1112, as described above. To avoid disruption during failover, it may be beneficial for each SP to run a spare local replication appliance, which effectively remains on standby in case of failure of another SP. In some examples, any replication appliance can be the owner of any number of consistency groups. Thus, another way of managing failover is to make the local replication appliance on SP120*a* the owner of CG 1 as well as any other consistency groups that the local replication appliance on SP120*a* may already own, and then to operate the local replication appliance on SP120*a* to perform synchronous replication for CG 1 as well as for any other such consistency group(s).

When operation of SP 120 is later restored (e.g., after a reboot), processing of IO requests 1112 can effectively fail back to SP 120. For example, SP 120 restarts the local replication appliance 760/860 on SP 120 and causes it to join the cluster 1250 and take ownership of CG 1. Processing of IO requests 1112 may then proceed as described above in connection with FIG. 12*a*.

Figure 13A:
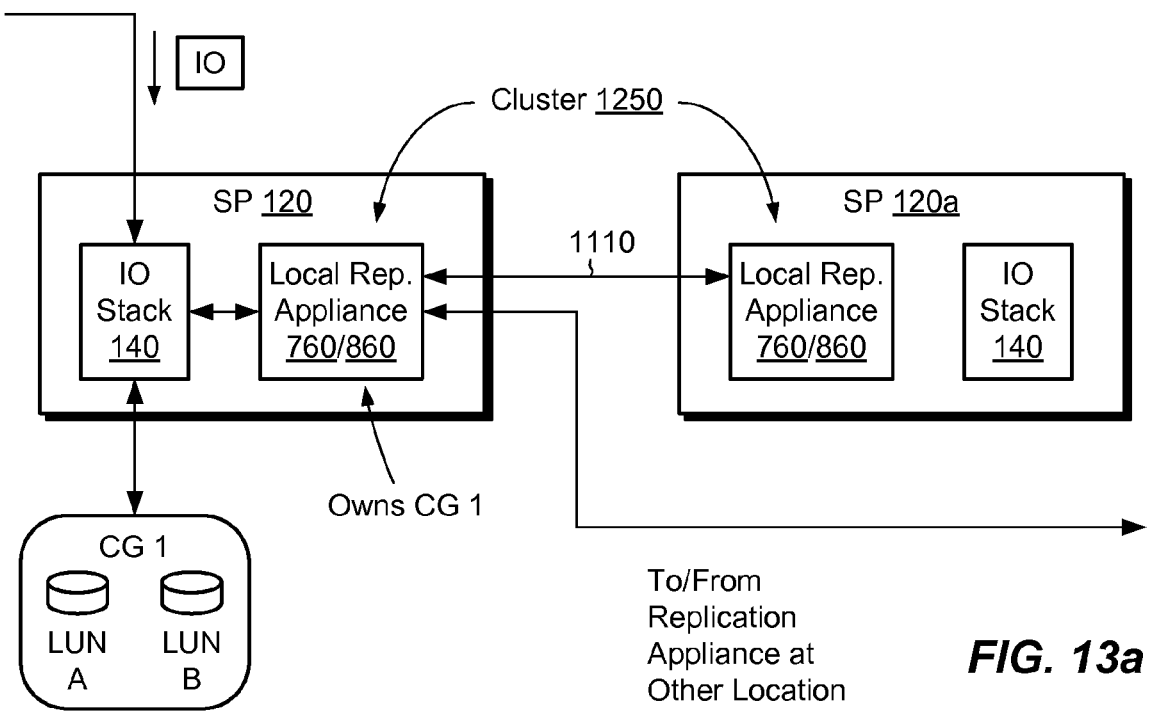
FIGS. 13*a* and 13*b* are block diagrams showing an example load balancing operation between two storage processors of the data storage system.
Figure 13B:
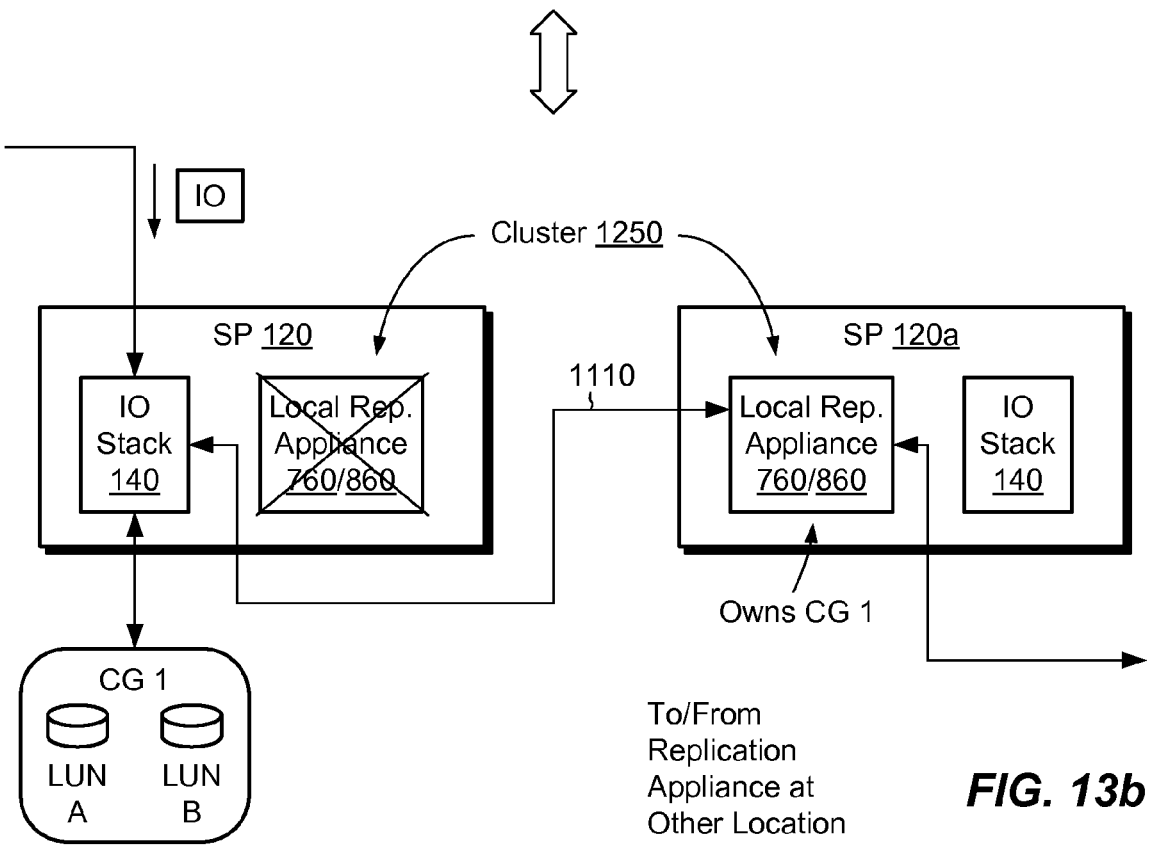

FIGS. 13*a* and 13*b* show an example load balancing arrangement between SP 120 and SP 120*a*, which may be initially configured in a similar manner to that shown in FIG. 12*a*. It is not required that the SP 120 and SP 120*a* be arranged in a functional pair; rather, the SPs 120 and 120*a* may be any two SPs in the data storage system 116. As described above, replication appliances perform a range of functions, which include not only data mirroring but also data compression, which can be computationally intensive. Thus, one way of balancing loads among SPs is to move a replication appliance operating on a busy SP to another SP that is less busy.

In the arrangement shown in FIG. 13*a*, the data storage system 116 may detect that SP 120 is highly burdened while SP 120*a* is not. To improve load balance, SP 120 offloads some or all of the functions of its local replication appliance to SP 120*a*. As shown in FIG. 13*b*, the local replication appliance 760/860 running on SP 120*a* takes ownership of CG 1 and communicates with the IO stack 140 on SP 120 to mirror IO requests. SP 120 may shut down the replication appliance on SP 120 if it does not own any other consistency groups. Going forward, the IO stack 140 on SP 120 continues to receive IO requests directed to CG 1, but the replication splitter 226 (FIG. 2) in the IO stack on SP 120 directs the IO requests to the replication appliance on SP 120*a* to effect data mirroring and data compression. The processing load on SP 120 is thereby reduced, whereas the processing load on SP 120*a* is increased, thus effecting better load balance.

Over time, the load on SP 120*a* may further increase, such that SP 120*a* becomes more highly taxed than SP 120. If this occurs, SP 120 may restore operation of the local replication appliance on SP 120 (if it was shut down), cause the local replication appliance on SP 120 to take ownership of CG 1, and proceed to process IO requests as shown in FIG. 13*a*. Thus, the above-described load balancing arrangement is completely reversible.

As already mentioned, a replication appliance can own and thus perform replication operations for multiple consistency groups. Therefore, another way of achieving load balance among SPs is to redistribute consistency groups among different replication appliances on different SPs. For example, a consistency group owned by a replication appliance on a first SP can be moved to a replication appliance on a second SP. The replication appliance on the first SP may continue to own one or more other consistency groups and may continue to perform replication operations for such consistency groups, but its overall workload is reduced while that of the second SP is increased, thus effecting better load balance.

Figure 14A:
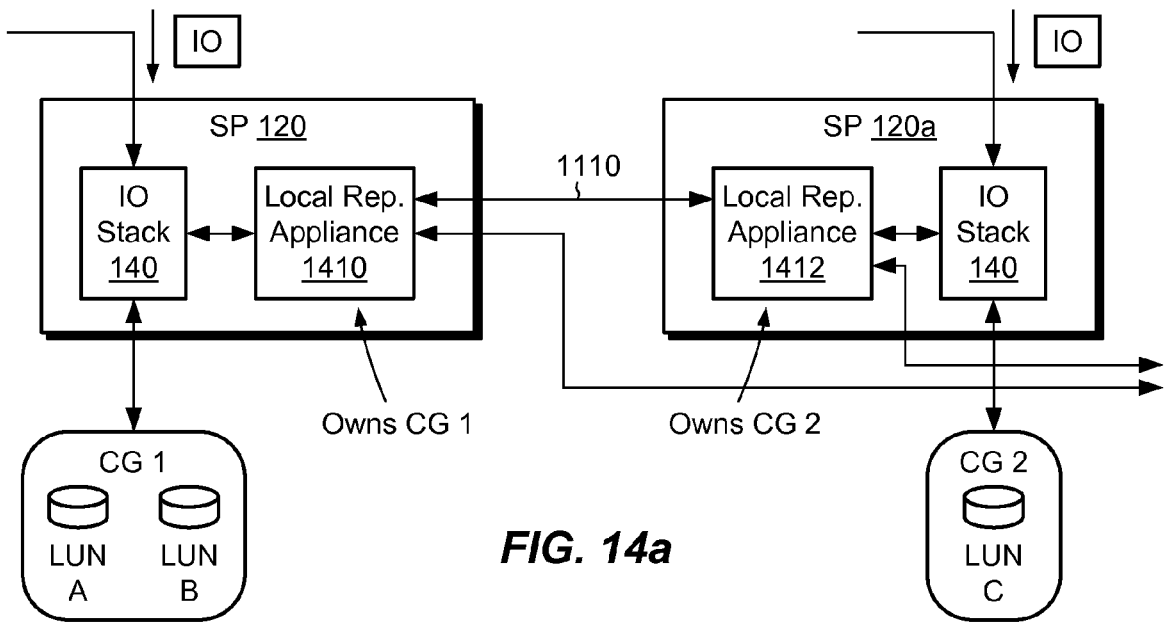
FIGS. 14*a* and 14*b* are block diagrams showing another example failover and failback scenario between two storage processors of the data storage system.
Figure 14B:
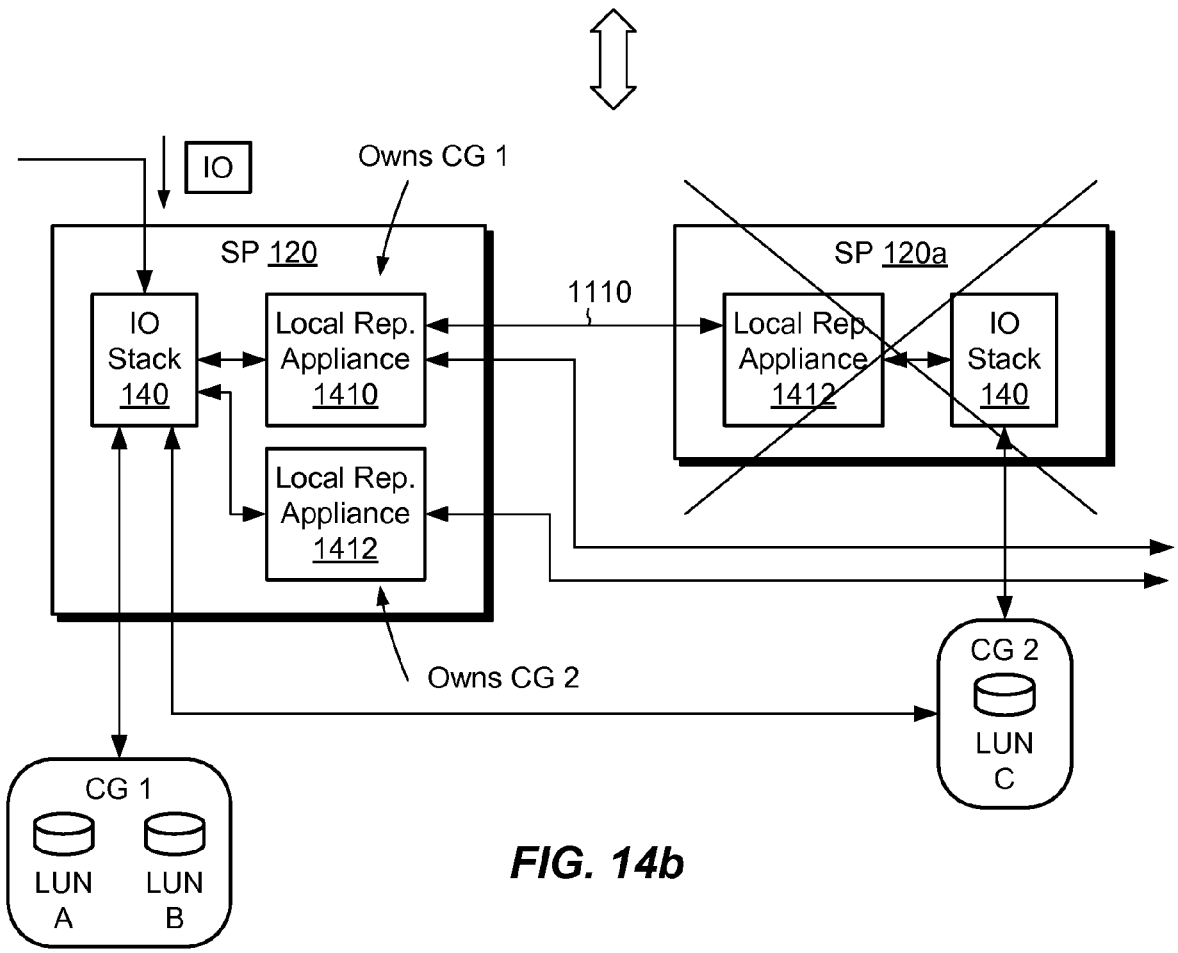

FIGS. 14*a* and 14*b* show another example failover and failback arrangement. Here, SP 120 runs an IO stack 140 and a local replication appliance 1410 and SP 120*a* runs an IO stack 140 and a local replication appliance 1412. SP 120 processes IO requests directed to a first consistency group, CG 1, and SP 120*a* processes IO requests directed to a second consistency group, CG 2 (including LUN C). Replication appliance 1410 is the owner of CG1 and replication appliance 1412 is the owner of CG 2.

As shown in FIG. 14*a*, each of the SPs 120 and 120*a* handles synchronous replication for a respective consistency group. The IO stack 140 on SP 120 receives IO requests specifying data writes to LUNs of CG 1 and coordinates with the local replication appliance 1410 to mirror specified data to the remote site. Similarly, the IO stack 140 on SP 120*a* receives IO requests specifying data writes to the LUN of CG 2 and coordinates with the local replication appliance 1412 to mirror specified data to the remote site. It is not necessary that the local replication appliances 1410 and 1412 be part of the same cluster.

As shown in FIG. 14*b*, SP 120*a* has failed and become unavailable. In response to the failure on SP 120*a*, SP 120 creates a new instance of the local replication appliance 1412 that previously operated in SP 120*a*. If SP 120 already ran a spare local replication appliance, SP 120 can simply configure the spare as appliance 1412 and assign it ownership of CG 2. The IO stack 140 of SP 120 then receives IO requests directed to both CG 1 and CG 2. The replication splitter 226 (FIG. 2) contacts the appliance 1410 for mirroring IO requests directed to CG 1 and contacts the appliance 1412 for mirroring IO requests directed to CG 2. The SP 120 thus manages synchronous replication of IO requests directed to both consistency groups through respective replication appliances running on the SP 120.

Although FIG. 14*b* shows the SP 120 running two replication appliances 1410 and 1412 for two consistency groups, it is understood that an SP can run any number of replication appliances for any number of consistency groups. In examples where each replication appliance can be the owner of multiple consistency groups, the local replication appliance 1410 may take ownership of CG 2 and support synchronous replication for both CG 1 and CG 2. In such examples, no additional replication appliance 1412 is needed.

Also, it is understood that replication operations may fail back to the arrangement of FIG. 14*a*. For example, once operation of SP 120*a* is restored, the SP 120*a* restarts the local replication appliance 1412 on SP 120*a* and assigns it ownership of CG 2. SP 120 stops operation of the new instance of the local replication appliance 1412 on SP 120 (or revokes ownership of CG 2 from the appliance 1410), and operation proceeds according to the arrangement shown in FIG. 14*a*.

Figure 15:
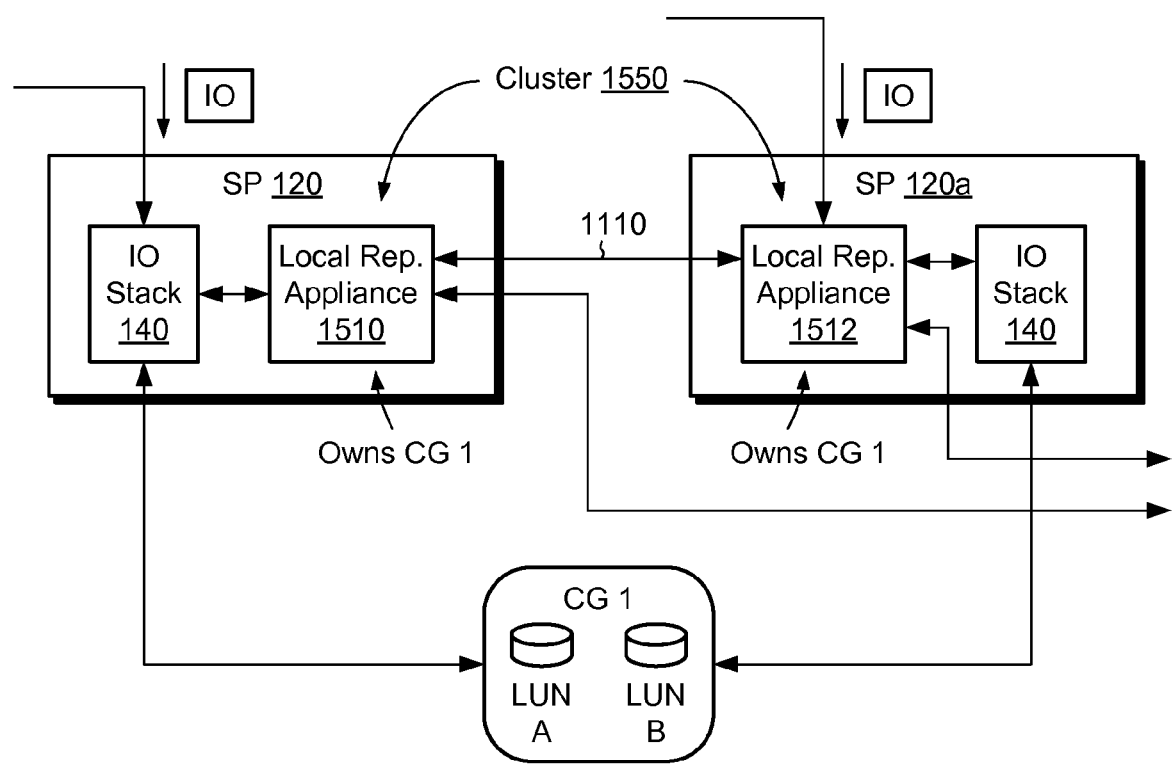
FIG. 15 is a block diagram showing an example active-active data access arrangement between two storage processors of the data storage system.

FIG. 15 shows an example synchronous replication arrangement where two SPs 120 and 120*a* each handle IO requests directed to a single consistency group, CG 1, in an active-active arrangement. Here, each of the SPs 120 and 120*a* runs an IO stack 140 and a local replication appliance, 1510 and 1512, respectively. The appliances 1510 and 1512 may be part of a cluster 1550, and both appliances 1510 and 1512 may be designated as owners of CG 1.

In some examples, one of the replication appliances 1510 or 1512 is designated as a master. For example, appliance 1510 may be designated as a master, and the IO stacks 140 on both SPs 120 and 120a contact the appliance 1510 (the master) directly when mirroring IO requests. The master determines whether to handle the mirroring itself or to delegate mirroring to the appliance 1512 (or to some other member of the cluster 1550). In other examples, there is no master and each of the appliances 1510 and 1512 communicates directly with the IO stack 140 on the respective SP to effect IO request mirroring.

It is not strictly necessary that both appliances 1510 and 1512 own CG 1 at the same time. For example, appliance 1510 may take ownership of CG 1 in response to the SP 120 receiving an IO request directed to CG 1. Likewise, appliance 1512 may take ownership of CG 1 in response to SP 120a receiving an IO request directed to CG 1. Thus, shared ownership of CG 1 need not require simultaneously shared ownership.

In still other examples, only a single appliance 1510 or 1512 owns CG 1. Although IO stacks 140 on both SPs 120 and 120a receive IO requests directed to CG 1, the IO stacks 140 both communicate with the appliance that owns CG 1 to effect remote mirroring. Such arrangements are less efficient than those involving shared ownership, however, as they require substantial data transfer over the pathway 1110, which is often already highly utilized and can thus become a bottleneck. Thus, shared ownership of consistency groups is generally preferred in active-active arrangements.

Figure 16:
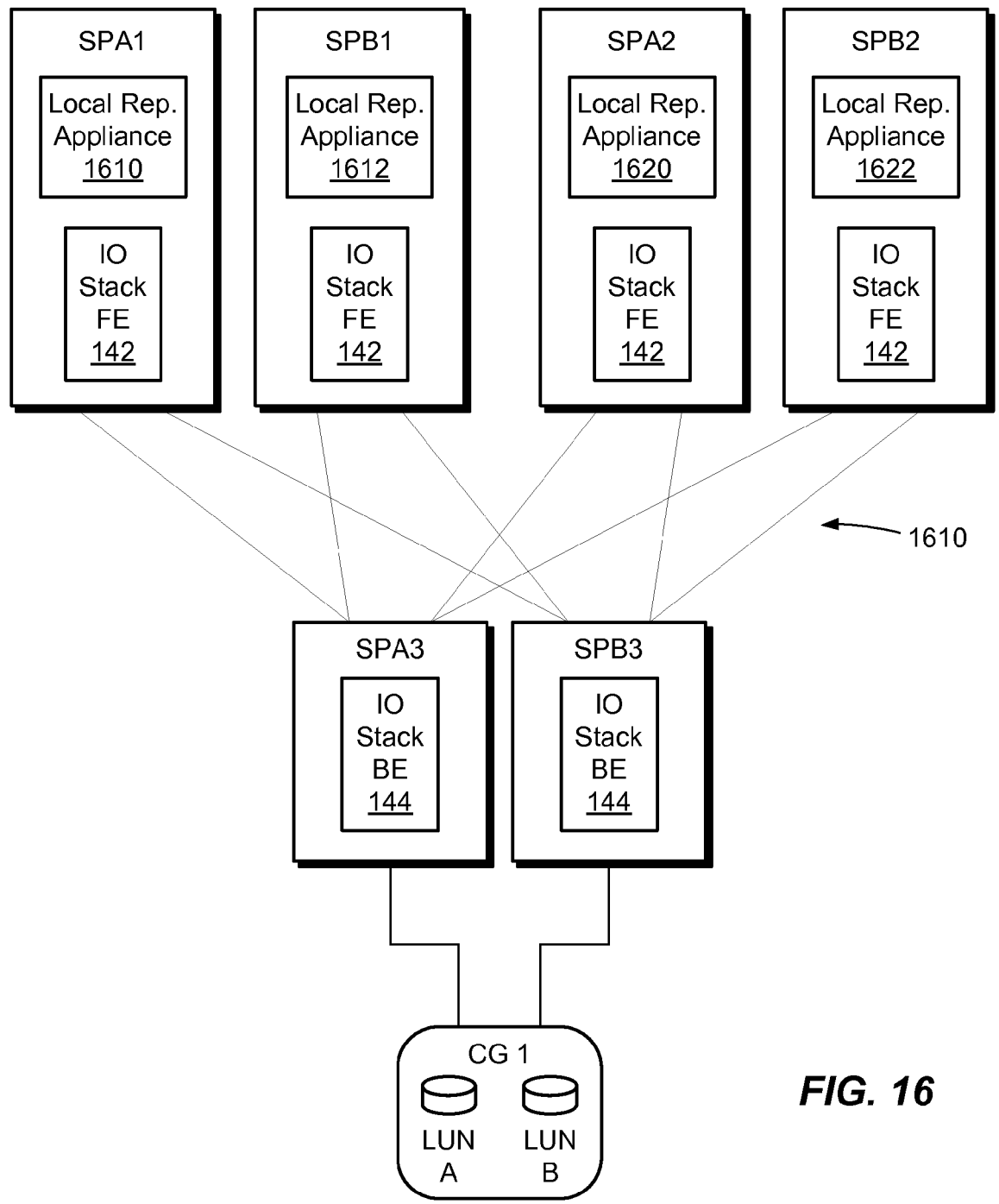
FIG. 16 is a block diagram showing an example modular arrangement of multiple storage processors of the data storage system.

FIG. 16 shows an example arrangement of SPs for performing synchronous replication in a modular configuration. In this example, each SP runs either the IO stack front end 142 or the IO stack backend 144, but not both. Also, SPs are provided in pairs, with two pairs (SPA1/SPB1 and SPA2/SPB2) running IO stack front ends 142 and one pair (SPA3/SPB3) running IO stack back ends 144. Each of the SPs running a front end 142 also runs a local replication appliance, shown as 1610, 1612, 1620, and 1622. Further, each of the SPs running a front end 142 is coupled to each of the SPs running a back end 144 over a medium 1610 (e.g., Fibre Channel, InfiniBand, iSCSI, etc.), which supports communication between the IO stack front ends 142 and the IO stack back ends 144 using a block-based protocol. In this example, the SPs running IO stack back ends 144 (SPA3 and SPB3) are each coupled to the storage 180 (FIG. 1) for accessing LUN A and LUN B of CG 1.

In the modular arrangement shown in FIG. 16, IO requests received by four SPs (SPA1, SPB1, SPA2, and SPB2) funnel down to two SPs (SPA3 and SPB3). Additional SPs having front ends may be added to the arrangement, with each additional SP connecting to each of the SPs running a back end 144. Thus, rather the arrangement providing funneling from four to two SPs, it may instead funnel from six to two or eight to two.

It should be understood that it is also possible to run embedded replication appliances on SPA3 and SPB3. For example, such replication appliances may operate in one or more clusters with replication appliances 1610, 1612, 1620, and 1622 to support load balancing and failover. Also, it may be possible to run embedded replication appliances exclusively on SPA3 and SPB3. Care should be taken in such configurations, however, to avoid overly burdening SPA3 and SPB3. A more conservative approach may therefore be to run embedded replication appliances on SPs running front ends only (as shown), as this approach effectively scales as the number of SPs running front ends 142 increases.

It should also be understood that the storage processors SPA3 and SPB3 in the illustrated modular arrangement may be replaced with a block-based array, such as a VMAX array, to form a gateway arrangement. In a gateway arrangement (not shown), the block-based array includes an IO stack back end internally and each of the SPs running front ends (SPA1, SPB1, SPA2, and SPB2) connects to the block-based array using a block-based protocol. As in the modular arrangement, the gateway arrangement may benefit from running an embedded replication appliance (or multiple appliances) in each SP running a front end 142.

Figure 17:
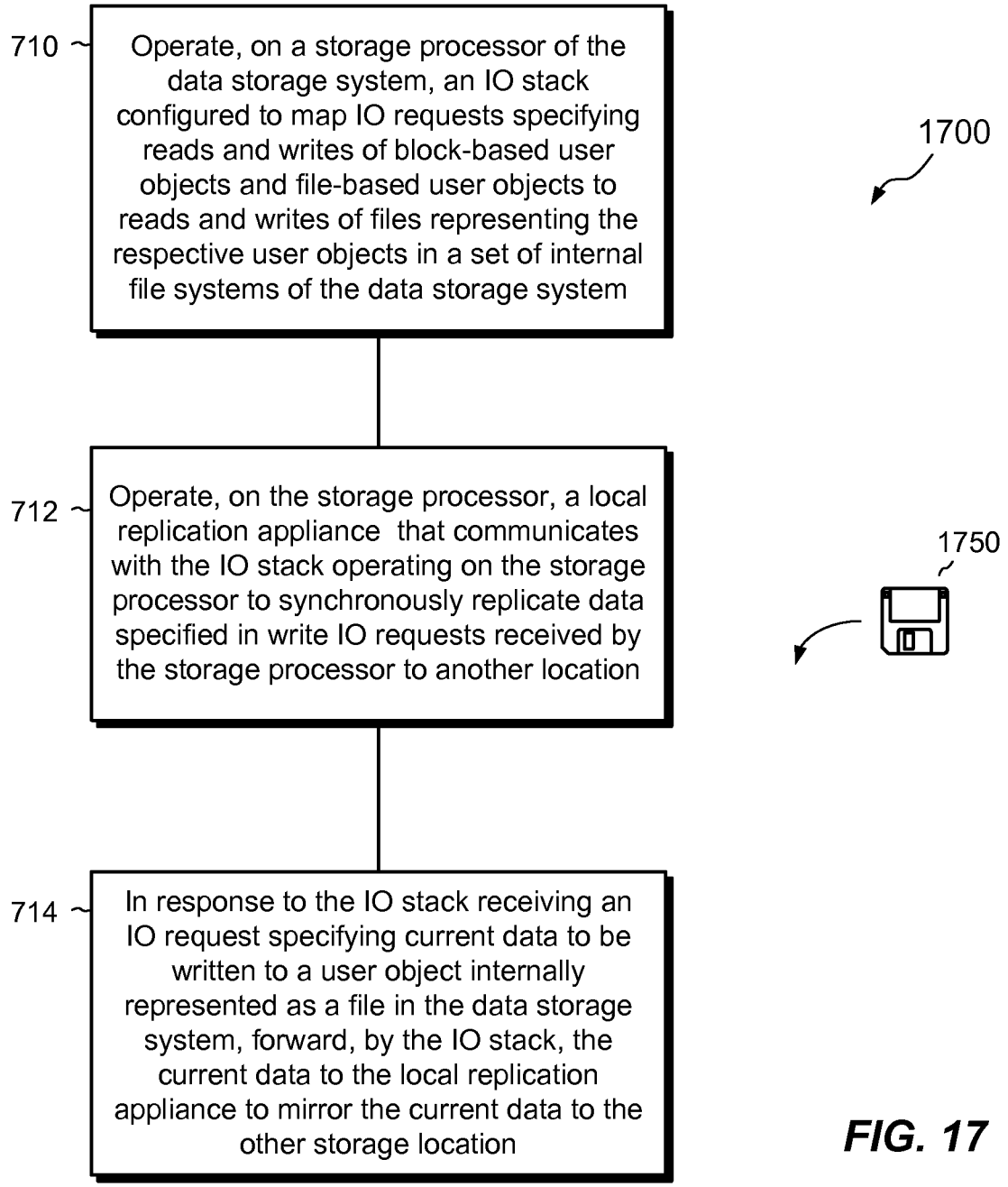
FIG. 17 is a flowchart showing an example process for performing synchronous replication in the data storage system of FIG. 7 or 8.

FIG. 17 shows an example process 1700 for performing synchronous replication in a data storage system. In an example, the process 1700 is performed by the SP 120 (or some other SP) using the software constructs described in connection with FIGS. 1-3 and further described in connection with FIGS. 7 and/or 8.

At step 1710, an IO stack is operated on a storage processor of the data storage system. The IO stack is configured to map IO requests specifying reads and writes of block-based user objects and file-based user objects to reads and writes of files representing the respective user objects in a set of internal file systems of the data storage system. For example, the IO stack 140 is operated on SP 120 of the data storage system 116. As shown in FIGS. 2 and 3, the IO stack 140 is configured to map IO requests 112 (FIG. 2) specifying reads and writes of block-based user objects and file-based user objects to reads and writes of files (e.g., files 336 and 346; FIG. 3) representing the respective user objects in a set of internal file systems (e.g., 230, FIG. 2) of the data storage system 116.

At step 1712, a local replication appliance is operated on the storage processor. The local replication appliance communicates with the IO stack operating on the storage processor to synchronously replicate data specified in write IO requests received by the storage processor to another location. For example, the local replication appliance 760 or 860 operates on the SP 120 to synchronously replicate data specified in write IO requests (e.g., 712) to another location, such as a remote site (see FIG. 4).

At step 1714, in response to the IO stack receiving an IO request specifying current data to be written to a user object internally represented as a file in the data storage system, the IO stack forwards the current data to the local replication appliance to mirror the current data to the other storage location. For example, the IO stack 140 receives IO requests (e.g., 712) specifying data to be written to a user object (such as a LUN, file system, vVOL, etc.) represented as a file (e.g., 336, 346) and forwards the data specified in the request to the local replication appliance 760 or 860, which mirrors the data to the remote location.

An improved technique has been described that performs synchronous replication of both block-based objects and file-based objects using a replication appliance (e.g., 760 or 860) embedded alongside a unified data path IO stack 140 within a storage processor 120 of a data storage system 116. The embedded replication appliance operates as a software construct and can be implemented at little or no additional hardware cost and in a manner that is highly integrated with the IO stack 140. The improved technique thus reduces cost, reduces latency as compared with designs employing external replication appliances, and supports replication of both block-based objects and file-based objects. Further, embedding the replication appliance with a storage processor simplifies setup and maintenance, as the embedded replication appliance becomes part of the data storage system rather than a separate product requiring its own configuration and maintenance.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, although the embedded replication appliance has been described for performing synchronous replication, the embedded replication appliance may also be used for performing asynchronous replication. For example, an embedded replication appliance (or cluster of appliances) can be configured to accumulate data received from the replication splitter 226 over the course of multiple data writes and to mirror the accumulated data to a second location asynchronously, e.g., on some schedule or in response to some set of events. For asynchronous replication, the replication appliance may acknowledge back to the splitter 226 as soon as it receives data from the splitter 226, so as to avoid unduly delaying the normal propagation of TO requests down the TO stack 140. Embedded replication appliances are particularly well suited for this type of asynchronous replication, as they can communicate rapidly with the splitter 226, without the delays inherent in communicating over distance, as well as the multiple network hops that accompany the use of external replication appliances.

Further, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1750 in FIG. 17). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further still, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of performing synchronous replication in a data storage system, comprising:
   operating, on a storage processor of the data storage system, an IO (Input/Output) stack configured to map IO requests specifying reads and writes of block-based user objects and file-based user objects to reads and writes of files representing the respective user objects in a set of internal file systems of the data storage system, the IO stack including a replication splitter configured selectively to intercept IO requests within the IO stack;
   operating, on the storage processor, a local replication appliance that communicates with the IO stack via the replication splitter, the local replication appliance operating on the storage processor to synchronously replicate data specified in write IO requests received by the storage processor to another location; and
   in response to the IO stack receiving an IO request specifying current data to be written to a user object internally represented as a file in the data storage system, the replication splitter (i) intercepting the IO request in the IO stack, (ii) forwarding the current data to the local replication appliance to mirror the current data to the other storage location, and (iii) allowing the IO request to continue propagating down the IO stack to perform a write to local storage in response to the replication splitter receiving an acknowledgement from the local replication appliance that the current data have been persisted at the other location.

2. A method as in claim 1, further comprising:
   suspending operation of the local replication appliance synchronously replicating data specified in write IO requests received by the storage processor to the other location; and
   operating an external replication appliance to resume synchronously replicating data writes received by the storage processor, the external replication appliance communicating with the IO stack operating on the storage processor over a network to perform synchronous replication of data writes directed to the storage processor to the other storage location.

3. A method as in claim 1, further comprising operating a virtualization platform on the storage processor, wherein operating the local replication appliance includes running the local replication appliance in a virtual machine running on the virtualization platform and communicating with the IO stack using IPC (Inter Process Communication).

4. A method as in claim 3, further comprising:
   running a second virtualization platform on a computerized apparatus coupled to the storage processor over a network;
   creating a virtual machine on the second virtualization platform;
   suspending operation of the local replication appliance synchronously replicating data specified in write IO requests received by the storage processor to the other location; and
   operating an external replication appliance on the virtual machine running on the second virtualization platform to resume synchronously replicating data writes received by the storage processor, the external replication appliance communicating with the IO stack operating on the storage processor over the network to perform synchronous replication of data writes directed to the storage processor.

5. A method as in claim 3, further comprising:
   running a second replication appliance external to the storage processor;
   forming a replication appliance cluster between the local replication appliance and the second replication appliance; and
   in response to the IO stack receiving an IO request specifying data to be written to a user object internally represented as a file in the data storage system, the IO stack forwarding the data to the local replication appliance and the replication appliance cluster mirroring the data to the other storage location.

6. A method as in claim 5, further comprising:
   running a second virtualization platform on a computerized apparatus coupled to the storage processor over a network;

creating a second virtual machine on the second virtualization platform; and running the second replication appliance on the second virtual machine created on the second virtualization platform running on the computerized apparatus.

7. A method as in claim 3, further comprising:

running a set of additional replication appliances on one or more respective other storage processors of the data storage system;

forming a replication appliance cluster among the local replication appliance and each of the set of additional replication appliances; and in response to the IO stack receiving an IO request specifying data to be written to a user object internally represented as a file in the data storage system, the IO stack forwarding the data to the local replication appliance and the replication appliance cluster mirroring the data to the other storage location.

8. A method as in claim 7, wherein the local replication appliance owns a consistency group that includes a set of storage volumes that the data storage system manages together as a group, and wherein, upon a failure of the storage processor, the method further comprises:

transferring ownership of the consistency group from the local replication appliance to another replication appliance in the replication appliance cluster; and in response to an IO stack on another storage processor of the data storage system receiving an IO request specifying data to be written to a user object stored in a volume that belongs to the consistency group, the other IO stack forwarding the data to the other replication appliance and the replication appliance cluster mirroring the data to the other storage location.

9. A method as in claim 7, further comprising, in response to detecting that the storage processor is more heavily utilized than one of the other storage processors running another replication appliance in the replication appliance cluster, transferring ownership of a consistency group from the local replication appliance to the other replication appliance, the consistency group including a set of storage volumes that the data storage system manages together as a group; and in response to the IO stack receiving an IO request specifying data to be written to a user object stored in a volume that belongs to the consistency group, the IO stack forwarding the data to the other replication appliance and the other replication appliance mirroring the data to the other storage location.

10. A method as in claim 9, further comprising shutting down the local replication appliance after transferring ownership of the consistency group from the local replication appliance to the other replication appliance when the local replication appliance owns no other consistency groups.

11. A method as in claim 3, wherein the storage processor is a first storage processor, wherein the local replication appliance performs synchronous replication of data writes directed to a storage volume belonging to a first consistency group, and wherein the method further comprises:

operating a second IO stack on a second storage processor of the data storage system; and operating, on the second storage processor, a second local replication appliance, the second local replication appliance communicating with the second IO stack operating on the second storage processor to perform synchronous replication of data writes directed to storage volumes belonging to a second consistency group, wherein the first consistency group includes a first set of storage volumes that the data storage system manages together as a group and wherein the second consistency group includes a second set of storage volumes, distinct from the first set of storage volumes, that the data storage system manages together as a group.

12. A method as in claim 11, wherein upon a failure of the second storage processor, the method further comprises:

starting a new instance of the second local replication appliance on the first storage processor; and operating, on the first storage processor, the new instance of the second local replication appliance to communicate with the IO stack operating on the first storage processor to perform synchronous replication of data writes directed to the storage volumes belonging to the second consistency group.

13. A method as in claim 12, wherein, upon the second storage processor resuming operation after the failure is resolved, stopping operation of the new instance of the second local replication appliance on the first storage processor; and restoring operation of the second local replication appliance on the second storage processor, the second local replication appliance then communicating with the second IO stack operating on the second storage processor to perform synchronous replication of data writes directed to storage volumes belonging to the second consistency group.

14. A method as in claim 11, wherein upon a failure of the second storage processor, the method further comprises:

making the local replication appliance on the first storage processor an owner of the second consistency group; and operating, on the first storage processor, the local replication appliance to communicate with the IO stack operating on the first storage processor to perform synchronous replication of data writes directed to the storage volumes belonging to the second consistency group.

15. A method as in claim 3, wherein the storage processor is a first storage processor, wherein the local replication appliance performs synchronous replication of data writes directed to a storage volume belonging to a consistency group, and wherein the method further comprises:

operating a second IO stack on a second storage processor of the data storage system in an active-active arrangement with the first storage processor; and operating, on the second storage processor, a second local replication appliance, the second local replication appliance communicating with the second IO stack operating on the second storage processor to perform synchronous replication of data writes directed to the storage volume belonging to the consistency group.

16. A method as in claim 3, wherein the IO stack is a front-end IO stack and wherein the method further comprises running a back-end IO stack on a back-end storage apparatus realized as one of (i) another storage processor of the data storage system and (ii) a block-based array, and communicating between the front-end IO stack and the back-end IO stack using a block-based protocol.

17. A method as in claim 16, further comprising running a respective front-end IO stack on each of a set of additional storage processors of the data storage system, and communicating between each of the front-end IO stacks and the back-end IO stack using the block-based protocol.

18. A method as in claim 3, wherein the IO stack is operated on the storage processor outside the virtualization platform.

19. A method as in claim 1,
wherein operating the local replication appliance to synchronously replicate the data specified in the write requests to another location includes replicating the data to another data storage system at the other location, and
wherein operating the IO stack includes mapping IO requests specifying reads of a block-based user object to reads of a file representing the block-based user object, the file being disposed within an internal file system of the data storage system, the block-based user object being one of a LUN (Logical Unit Number) and a block-based VVol.

20. A data storage system comprising a set of processing units and memory, the memory coupled to the set of processing units, the set of processing units and the memory together forming control circuitry constructed and arranged to:
operate, on a storage processor of the data storage system, an IO (Input/Output) stack configured to map IO requests specifying reads and writes of block-based user objects and file-based user objects to reads and writes of files representing the respective user objects in a set of internal file systems of the data storage system, the IO stack including a replication splitter configured selectively to intercept IO requests within the IO stack;
operate, on the storage processor, a local replication appliance that communicates with the IO stack via the replication splitter, the local replication appliance operating on the storage processor to synchronously replicate data specified in write IO requests received by the storage processor to another location; and
in response to receipt by the IO stack of an IO request specifying current data to be written to a user object internally represented as a file in the data storage system, (i) intercept, by the replication splitter, the IO request, (ii) forward, by the replication splitter in the IO stack, the current data to the local replication appliance to mirror the current data to the other storage location, and (iii) allow the IO request to continue propagating down the IO stack to perform a write to local storage in response to the replication splitter receiving an acknowledgement from the local replication appliance that the current data have been persisted at the other location.

21. A computer program product having a non-transitory computer-readable medium including instructions which, when executed by control circuitry of a data storage system, cause the control circuitry to perform a method of performing synchronous replication in the data storage system, the method comprising:
operating, on a storage processor of the data storage system, an IO (Input/Output) stack configured to map IO requests specifying reads and writes of block-based user objects and file-based user objects to reads and writes of files representing the respective user objects in a set of internal file systems of the data storage system, the IO stack including a replication splitter configured selectively to intercept IO requests within the IO stack;
operating, on the storage processor, a local replication appliance that communicates with the IO stack via the replication splitter, the local replication appliance operating on the storage processor to synchronously replicate data specified in write IO requests received by the storage processor to another location; and
in response to the IO stack receiving an IO request specifying current data to be written to a user object internally represented as a file in the data storage system, the replication splitter (i) intercepting the IO request in the IO stack, (ii) forwarding the current data to the local replication appliance to mirror the current data to the other storage location, and (iii) allowing the IO request to continue propagating down the IO stack to perform a write to local storage in response to the replication splitter receiving an acknowledgement from the local replication appliance that the current data have been persisted at the other location.

22. A computer program product as in claim 21, wherein the method further comprises:
running a set of additional replication appliances on one or more respective other storage processors of the data storage system;
forming a replication appliance cluster among the local replication appliance and each of the set of additional replication appliances; and
in response to the IO stack receiving an IO request specifying data to be written to a user object internally represented as a file in the data storage system, the IO stack forwarding the data to the local replication appliance and the replication appliance cluster mirroring the data to the other storage location.

23. A computer program product as in claim 22, wherein the local replication appliance owns a consistency group that includes a set of storage volumes that the data storage system manages together as a group, and wherein, upon a failure of the storage processor, the method further comprises:
transferring ownership of the consistency group from the local replication appliance to another replication appliance in the replication appliance cluster; and
in response to the IO stack receiving an IO request specifying data to be written to a user object stored in a volume that belongs to the consistency group, the IO stack forwarding the data to the other replication appliance and the replication appliance cluster mirroring the data to the other storage location.

24. A computer program product as in claim 22, wherein the method further comprises, in response to detecting that the storage processor is more heavily utilized than one of the other storage processors running another replication appliance in the replication appliance cluster,
transferring ownership of a consistency group from the local replication appliance to the other replication appliance, the consistency group including a set of storage volumes that the data storage system manages together as a group;
shutting down the local replication appliance; and
in response to the IO stack receiving an IO request specifying data to be written to a user object stored in a volume that belongs to the consistency group, the IO stack forwarding the data to the other replication appliance and the replication appliance cluster mirroring the data to the other storage location.

* * * * *